US012714015B2

(12) United States Patent
Simpson

(10) Patent No.: US 12,714,015 B2
(45) Date of Patent: Aug. 25, 2026

(54) SYSTEM AND METHOD FOR AUTONOMOUS LAWN CARE

(71) Applicant: Euchron, Inc., Rapid City, SD (US)

(72) Inventor: Andrew Simpson, Summerset, SD (US)

(73) Assignee: Euchron, Inc., Rapid City, SD (US)

( * ) Notice: Subject to any disclaimer, the term of this patent is extended or adjusted under 35 U.S.C. 154(b) by 136 days.

(21) Appl. No.: 18/732,516

(22) Filed: Jun. 3, 2024

(65) Prior Publication Data

US 2024/0315165 A1 Sep. 26, 2024

Related U.S. Application Data

(63) Continuation of application No. 17/103,726, filed on Nov. 24, 2020, now Pat. No. 12,029,156.

(Continued)

(51) Int. Cl.

*A01D 34/00* (2006.01)
*A01D 34/74* (2006.01)

(Continued)

(52) U.S. Cl.

CPC ........... *A01D 34/008* (2013.01); *A01D 34/74* (2013.01); *G05B 19/4155* (2013.01);

(Continued)

(58) Field of Classification Search

CPC .. A01D 34/008; A01D 34/74; A01D 2101/00; G05B 19/4155;

(Continued)

(56) References Cited

U.S. PATENT DOCUMENTS 8,189,905 B2 5/2012 Eaton et al.
9,392,746 B2 7/2016 Darr et al.

(Continued)

FOREIGN PATENT DOCUMENTS

CN 102662400 9/2012
CN 204362577 6/2015

(Continued)

OTHER PUBLICATIONS

Adeodu et al., "Development of an Embedded Obstacle Avoidance and Path Planning Autonomous Solar Grass Cutting Robot for Semi-Structured Outdoor Environment," 2018 IEEE 7th International Conference on Adaptive Science & Technology (ICAST), Aug. 22-24, 2018, 11 pages.

(Continued)

*Primary Examiner* — Naeem Taslim Alam
(74) *Attorney, Agent, or Firm* — Brownstein Hyatt Farber Schreck, LLP

(57) ABSTRACT

Systems and methods may include an unmanned lawn mower that includes a predictive model service. The predictive model service may be trained by a machine learning system and may serve to autonomously control the unmanned lawn mower. In this way, the unmanned lawn mower may navigate throughout a lawn and may cut the lawn and/or perform other lawn maintenance procedures during the navigation. The system may also include a variety of sensors and cameras to detect image data and environmental data of an area surrounding the unmanned lawn mower. The image data and the environmental data may be provided to the predictive model service in order to control the operation of the unmanned lawn mower in real-time.

23 Claims, 14 Drawing Sheets

Related U.S. Application Data

(60) Provisional application No. 62/959,060, filed on Jan. 9, 2020.

(51) Int. Cl.
*A01D 101/00* (2006.01)
*G05B 19/4155* (2006.01)
*G05D 1/00* (2024.01)

(52) U.S. Cl.
CPC ......... *G05D 1/0022* (2013.01); *G05D 1/0088* (2013.01); *G05D 1/0214* (2013.01); *G05D 1/0219* (2013.01); *G05D 1/0246* (2013.01); *A01D 2101/00* (2013.01); *G05B 2219/31003* (2013.01); *G05B 2219/40224* (2013.01); *G05B 2219/45068* (2013.01); *G05B 2219/50391* (2013.01)

(58) Field of Classification Search
CPC ........... G05B 2219/31003; G05B 2219/40224; G05B 2219/45068; G05B 2219/50391; G05D 1/0022; G05D 1/0088; G05D 1/0214; G05D 1/0219; G05D 1/0246
See application file for complete search history.

(56) References Cited

U.S. PATENT DOCUMENTS

| | | | | |
|---|---|---|---|---|
| 10,346,691 | B2 | 7/2019 | Boyle | |
| 11,350,564 | B1 | 6/2022 | Hoyda | |
| 11,464,161 | B1 * | 10/2022 | Phanco | A01D 75/185 |
| 2005/0029025 | A1 | 2/2005 | Medina | |
| 2012/0158236 | A1 | 6/2012 | Chung | |
| 2015/0114519 | A1 | 4/2015 | Hyde | |
| 2015/0220086 | A1 | 8/2015 | Willgert | |
| 2016/0157422 | A1 | 6/2016 | Kohler | |
| 2016/0174459 | A1 | 6/2016 | Balutis | |
| 2018/0035606 | A1 | 2/2018 | Burdoucci | |
| 2018/0213731 | A1 | 8/2018 | Wykman | |
| 2018/0253096 | A1 | 9/2018 | Holgersson | |
| 2019/0159401 | A1 | 5/2019 | Reijersen Van Buuren | |
| 2019/0179326 | A1 | 6/2019 | Uemoto | |
| 2019/0208699 | A1 | 7/2019 | Hasegawa | |
| 2019/0216014 | A1 | 7/2019 | Hahn | |
| 2019/0364727 | A1 | 12/2019 | Yamada | |
| 2019/0384316 | A1 * | 12/2019 | Qi | G05D 1/0246 |
| 2020/0029496 | A1 | 1/2020 | Nam | |
| 2020/0120865 | A1 | 4/2020 | Di Biase | |
| 2020/0275605 | A1 | 9/2020 | Chen | |
| 2021/0037702 | A1 | 2/2021 | Aposhian | |
| 2021/0137006 | A1 | 5/2021 | Shearer | |
| 2021/0221664 | A1 | 7/2021 | Okamoto | |
| 2021/0341939 | A1 | 11/2021 | Lee | |
| 2022/0413489 | A1 * | 12/2022 | Nakano | G05D 1/223 |

FOREIGN PATENT DOCUMENTS

| | | |
|---|---|---|
| CN | 107409602 | 12/2017 |
| EP | 2689650 | 1/2014 |
| WO | WO16/098040 | 6/2016 |

OTHER PUBLICATIONS

Bosch Press Release, Power Tools, "Bosch uses artificial intelligence for lawnmowing," Aug. 29, 2018, Robert Bosch GmbH, Stuttgart, Germany, 8 pages.

Chandler et al., "The Next Generation Autonomous Lawn Mower," 2000 Florida Conference on Recent Advances in Robotics, May 405, 2000, Florida Atlantic University, 4 pages.

Circuit Breaker, "Roomba's creator made an autonomous lawnmower robot," The Verge, Jan. 30, 2019, https://www.theverge.com/circuitbreaker/2019/1/30/18202813/robot-terra-lawn-mower-autonomous-launch, 3 pages.

Dutta et al., "A Technical Review of Lawn Mower Technology," ABDU—Journal of Engineering Technology, ISSN: 2348-7305, vol. 4(I), 2016, pp. 179-182.

Reinforcement Learning: Smart Mower Agent, https://www.youtube.com/watch?v=hBC5tSeizXE, 1 pages.

University of Florida, "Robot Lawn Mower At UF Designed To Change Suburban Landscape," ScienceDaily, Aug. 8, 1997, www.sciencedaily.com/releases/1997/08/970808125601.htm, 2 pages.

Sciforce, "Machine Learning in Agriculture: Applications and Techniques," Mar. 22, 2019, https://medium.com/sciforce/machine-learning-in-agriculture-applications-and-techniquest-6ab501f4d1b5, 8 pages.

* cited by examiner

SYSTEM AND METHOD FOR AUTONOMOUS LAWN CARE

CROSS-REFERENCE TO RELATED APPLICATION

This application is a continuation of U.S. Non-Provisional patent application Ser. No. 17/103,726, filed Nov. 24, 2020, and entitled "System and Method for Autonomous Lawn Care", which claims the benefit under 35 U.S.C. § 119(e) of U.S. Provisional Patent Application No. 62/959,060, filed Jan. 9, 2020, and entitled "System and Method for Autonomous and Partially Autonomous Lawn Care," the contents of which are incorporated herein by reference as if fully disclosed herein in their entireties.

TECHNICAL FIELD

The provided disclosure generally relates to an autonomous, or semi-autonomous, vehicle for providing lawn care. The provided disclosure further relates to systems and methods for retrofitting lawn mowers with an apparatus or apparatuses for providing autonomous, or semi-autonomous, lawn mower control. Aspects of the provided disclosure additionally relate to systems and methods for low-bandwidth and zero-latency vehicle control.

BACKGROUND

Conventional lawn mowing and lawn care apparatuses typically require direct user control while cutting grass and/or providing other lawn care services such as aerating compacted soil, eliminating weeds or pests, and providing fertilizer to a lawn or field. For example, push mowers and riding mowers require a human operator to manually navigate the mowers over the area to be mowed. In such systems, the user is required to control an operation of the mower directly through, for example, throttle, steering, and cutting mechanisms. Drivable aerators, fertilizers, water trucks, and other turf-maintenance machines also typically require a human operator to drive the machine, determine when and where to engage the machine's various functions, and so on.

SUMMARY

According to one broad aspect, the disclosure provides a method of operating an at least partially autonomous lawn mowing system. The method of operating the lawn mowing system may include, at an unmanned lawn mower, navigating from an initial location to a mow operation start point. This navigation may include receiving navigation commands from a remote operator, and, in response to receiving the navigation commands, following a first path at least partially defined by the navigation commands to move from the initial location to the mow operation start point. The method of operating the lawn mowing system may further include, at the unmanned lawn mower, receiving a representation of an area to be mowed and receiving a command to initiate a mow operation of the area to be mowed. Upon receiving the command to initiate the mow operation, the method may include engaging a cutting mechanism, receiving image data from a camera system attached to the unmanned lawn mower, providing the image data as an input to a predictive model service, receiving an output from the predictive model service, the output at least partially defining a second path within the area to be mowed, and navigating the unmanned lawn mower along the second path within the area to be mowed. The method of operating the lawn mowing system may further include determining that the mow operation is complete and, in response to determining that the mow operation is complete, disengaging the cutting mechanism and returning to the initial location.

A method of operating an at least partially autonomous lawn mowing system may further include performing an obstacle detection operation that detects, via image data, an obstacle. In response to detecting the obstacle, a hazard value of the obstacle may be determined. In an event that the hazard value satisfies a threshold, the method may cease navigating the unmanned lawn mower along the second path within the area to be mowed, receive obstacle avoidance navigation commands from the remote operator, determine that an autonomous navigation restart condition has been satisfied, and, upon determining that the autonomous navigation restart condition has been satisfied, continue navigating the unmanned lawn mower along the second path within the area to be mowed.

A method of operating an at least partially autonomous lawn mowing system may further include transitioning from an autonomous mode to a remote-operated mode and, while in the remote-operated mode, determining, using at least one sensor on the unmanned lawn mower, spatial information of one or more objects proximate to the unmanned lawn mower, determining a communications latency between the unmanned lawn mower and a computer system associated with a remote operator, generating, based at least in part on the spatial information and the communications latency, a predicted environment of the unmanned lawn mower, displaying the predicted environment to the remote operator, and receiving, at the unmanned lawn mower, an operational command from the remote operator while the predicted environment is displayed to the remote operator, the operational command configured to steer the unmanned lawn mower.

In some embodiments, generating a predicted environment may further include determining a predicted location, relative to the unmanned lawn mower, of an object of one or more objects. A method of operating an at least partially autonomous lawn mowing system may further include determining a confidence value of the predicted location of the object. In some embodiments, displaying the predicted environment to a remote operator may further include displaying, in the predicted environment, a virtualized object representative of the object, the virtualized object having a graphical element representative of the confidence value of the predicted location of the object.

A method of operating an at least partially autonomous lawn mowing system may further include determining whether an operational command will cause an unmanned lawn mower to collide with an object of one or more objects and, in accordance with a determination that the operational command will cause the unmanned lawn mower to collide with the object, ceasing motion of the unmanned lawn mower.

In some embodiments, the representation of the area to be mowed may define a first sub-area specifying a first cutting height and a second sub-area specifying a second cutting height that is different than the first cutting height. A predictive model service may determine, based at least in part on the image data, a boundary between the first sub-area and the second sub-area.

In some embodiments, engaging the cutting mechanism may include engaging the cutting mechanism at the first cutting height when the unmanned lawn mower is located proximate to the first sub-area. Navigating the unmanned lawn mower along the second path may include navigating the unmanned lawn mower at a first speed in the first sub-area. Engaging the cutting mechanism may further include engaging the cutting mechanism at the second cutting height when the unmanned lawn mower is located proximate to the second sub-area. Navigating the unmanned lawn mower along the second path may further include navigating the unmanned lawn mower at a second speed in the second sub-area. The first speed may be different from the second speed.

In some embodiments, the predictive model service may at least partially determine the second path using a machine learning model trained at least in part on a number of simulated mow operations. In some embodiments, the predictive model service may at least partially determine the second path using a machine learning model trained at least in part on a training set including training data from a number of human-piloted mow operations.

A method of operating an at least partially autonomous lawn mowing system may include, at an unmanned lawn mower, navigating from an initial location to a first mow operation start point, receiving a first representation of a first maintenance zone, the first representation including a first cutting height, and receiving a command to initiate a first mow operation of the first maintenance zone. Upon receiving the command to initiate the first mow operation, the method may engage a cutting mechanism at the first cutting height, receive first image data from a camera system attached to the unmanned lawn mower, provide the first image data as a first input to a first predictive model service, receive a first output from the first predictive model service, the first output at least partially defining a first path within the first maintenance zone, and navigate the unmanned lawn mower along the first path within the first maintenance zone. The method may further determine that the first mow operation is complete and, in response to determining that the first mow operation is complete, may disengage the cutting mechanism and navigate to a second mow operation start point. The method may further receive a second representation of a second maintenance zone, the second representation including a second cutting height, and may initiate a second mow operation of the second maintenance zone. Upon initiating the second mow operation, the method may engage the cutting mechanism at the second cutting height, receive second image data from the camera system, provide the second image data as a second input to a second predictive model service, receive a second output from the second predictive model service, the second output at least partially defining a second path within the second maintenance zone, and navigate the unmanned lawn mower along the second path within the second maintenance zone. The method may further determine that the second mow operation is complete and, in response to determining that the second mow operation is complete, disengage the cutting mechanism. The command may be a first command and the method may receive a second command to initiate the second mow operation of the second maintenance zone.

In some embodiments, the first cutting height may correspond to a longer lawn height than the second cutting height, the cutting mechanism may rotate at a first cutting speed when at the first cutting height, the cutting mechanism may rotate at a second cutting speed when at the second cutting height, and the first cutting speed may be different from the second cutting speed.

The method may further include providing the first image data to a turf-health predictive model service, receiving a turf-health output from the turf-health predictive model service, the turf-health output including an identification of an affected turf region having a health condition, determining a turf location of the affected turf region, and administering at least one of water, an herbicide, a fungicide, a fertilizer, and a pesticide to the affected turf region.

In some embodiments, the first predictive model service may include a machine learning model trained at least in part on a number of simulated mow operations. The second predictive model service may further include a second machine learning model trained at least in part on a training set comprising image data from a number of human-piloted mow operations.

In some embodiments, the camera system may include a forward-facing camera configured to capture images in a forward direction of travel of the unmanned lawn mower and a downward-facing camera configured to capture images of turf in front of the unmanned lawn mower. The forward-facing camera and the downward-facing camera may operate together to provide the first image data to the first predictive model service and the second image data to the second predictive model service.

A system may be provided for maintaining an outdoor environment. The system may include an unmanned lawn mower. The unmanned lawn mower may include a camera system configured to receive image data of the outdoor environment, a steering mechanism configured to control a direction of travel of the unmanned lawn mower, a drive train configured to propel the unmanned lawn mower, a cutting mechanism configured to cut grass, and a controller communicatively coupled with the steering mechanism, the drive train, and the cutting mechanism. The controller may operate the steering mechanism and the drive train to navigate the unmanned lawn mower from an initial location to a mow operation start point, cause the cutting mechanism to move to a cutting height, receive a representation of an area to be mowed, and initiate a mow operation of the area to be mowed. The mow operation may include engaging the cutting mechanism, receiving the image data from the camera system, providing the image data as input to a predictive model service, receiving an output from the predictive model service, the output at least partially defining a path within the area to be mowed, navigating the unmanned lawn mower along the path, and, upon determining that the mow operation is complete, disengaging the cutting mechanism and navigating the unmanned lawn mower to the initial location.

In some embodiments, the camera system includes a forward-facing camera configured to capture images in a forward direction of travel of the unmanned lawn mower and a downward-facing camera configured to capture images of turf in front of the unmanned lawn mower. The forward-facing camera and the downward-facing camera may provide the image data to the predictive model service.

In some embodiments, the unmanned lawn mower includes a spreader configured to apply at least one of water, an herbicide, a fungicide, a fertilizer, and a pesticide to the area to be mowed. The controller may provide the image data to a turf-health predictive model service, receive a turf-health output from the turf-health predictive model service, the turf-health output including an identification of an affected turf region having a health condition, determine a location of the affected turf region, and administer at least one of water, the herbicide, the fungicide, the fertilizer, and the pesticide to the affected turf region.

In some embodiments, the unmanned lawn mower includes an articulable arm. The articulable arm may remove a flagpole from the area to be mowed.

In some embodiments, the unmanned lawn mower includes a wireless radio configured to receive remote control inputs from a remote server. The controller may be configured to control at least one of the steering mechanism, the drive train, and the cutting mechanism in response to the received remote control inputs.

In some embodiments, a virtual environment representing and/or based on the actual real-world environment of the lawn maintenance machine is displayed to the remote human operator while the remote human operator is controlling the lawn maintenance machine. For example, the virtual environment may be displayed to a user on a display screen, a virtual- or augmented-reality headset, or the like. The virtual environment may be generated from or otherwise based on spatial information that is captured by the lawn maintenance machine (e.g., from onboard cameras, sensors, etc.). In some cases, in order to account for communication and/or other delays between when the lawn maintenance machine captures the spatial information and when it is ultimately displayed to the user, the systems described herein generate a predicted virtual environment (also referred to as predicted environments) based on the captured spatial information. The predicted environments represent a prediction of the location of the lawn maintenance machine (and objects in the vicinity of the lawn maintenance machine) in real-time. Stated another way, the predicted environment is a predicted real-time display so that the remote human operator is not issuing commands to the lawn maintenance machine based on outdated position information (e.g., the position of the lawn maintenance machine and nearby objects from several seconds in the past). The predicted environments are generated using, for example, historical spatial information and operator commands.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

Figure 1:
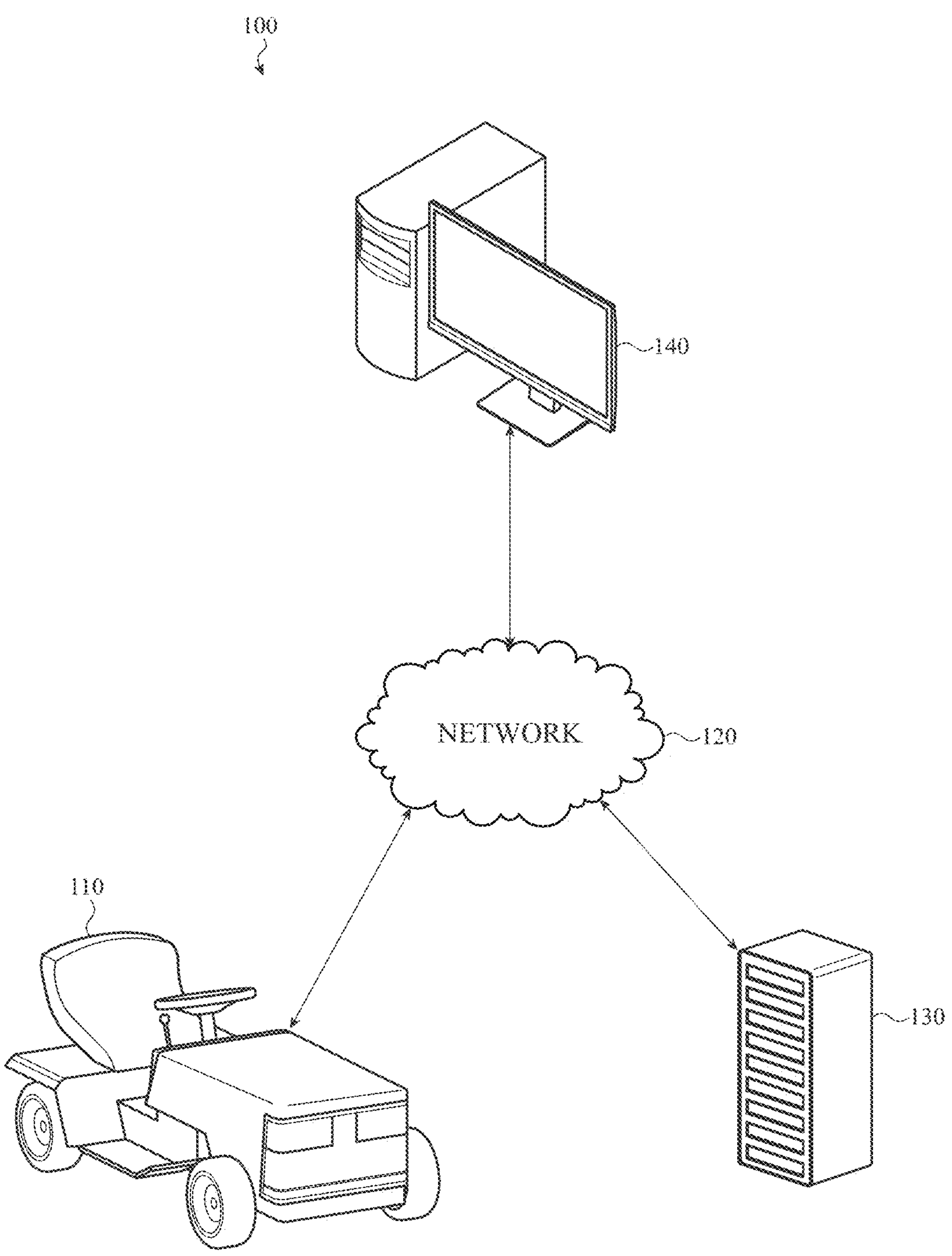
FIG. 1 is a schematic representation of a lawn maintenance machine, a server, and a network, such as described herein.

The use of the same or similar reference numerals in different figures indicates similar, related, or identical items. Additionally, it should be understood that the proportions and dimensions (either relative or absolute) of the various features and elements (and collections and groupings thereof) and the boundaries, separations, and positional relationships presented, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Conventional lawn mowing apparatuses may be particularly undesirable to, and/or detrimental to, owners or operators of fields spanning many acres and/or fields with complicated landscapes or sophisticated lawn care requirements. Such lawn mowers may lack certain features or may require direct human control. Accordingly, owners or operators of large fields (e.g., golf courses) may spend a large amount of money hiring multiple lawn care professionals to cut and tend to their grass in accordance with their specific requirements (e.g., for a golf course, grass in the "rough" is cut longer, grass in the "fairway" is cut at a medium length, and grass on a "green" is cut at a short length).

The instant disclosure relates generally to systems and methods for providing lawn care, and more particularly to implementing one or more predictive models configured to autonomously or semi-autonomously control a lawn maintenance machine for the purpose of, for example: cutting grass; administering water, herbicides, fungicides, pesticides, fertilizer and/or other chemicals; taking turf-health measurements; deterring unwanted pests; and so on.

In some embodiments, apparatuses and techniques for autonomously controlling a lawn mower without a human operator are presented. Using artificial intelligence and/or machine learning techniques, a lawn mower of the present disclosure may be able to automatically determine, as a non-limiting example, a target grass-height, and may, without human intervention, operate the mower to cut the grass to the target height.

To facilitate such autonomous operation, a server may be provided with a variety of databases and predictive model services. The server may transmit information via a network to a lawn maintenance machine so that the lawn maintenance machine may autonomously perform a wide variety of maintenance actions, such as, for example: capturing or dispersing pest animals; providing water, herbicides, fungicides, pesticides, fertilizer and/or other chemicals to a lawn; and so on. By using, for example, artificial intelligence and/or machine learning techniques (e.g., predictive model services trained using machine learning techniques), a lawn maintenance machine may be able to perform lawn maintenance more quickly and/or at a reduced cost as compared to conventional manual lawn maintenance machinery and manual labor. Further, by using artificial intelligence and/or machine learning, the lawn maintenance machines described herein may be able to operate largely without human intervention or control, and, while operating autonomously, may respond in real-time to unexpected or unplanned-for variations in turf conditions, obstacles, and the like. The server may be located at any suitable location and may be located, either partially or entirely, on the lawn maintenance machine.

Embodiments described herein relate to a lawn care method in which one or more maintenance model(s) incorporate or use, for example: mapping data; vehicle data; plant-life data; machine intelligence models; and the like, to control aspects of lawn or turf maintenance operations. The maintenance model(s) described herein can provide autonomous or semi-autonomous mowing operations, such as by autonomously mowing an area based on a user-defined boundary and one or more user-selected mowing preferences (e.g., the mowing pattern for the defined area). The maintenance model(s) may also be leveraged to detect and determine user-specific preferences for and/or preferences against particular attributes, features, aesthetic styles, and so on which, in turn, can be used to autonomously select lawn maintenance parameters. For example, the maintenance model(s) may be able to select a lawn cutting pattern (e.g., diamonds, stripes, and circles) and may be able to cut grass in different zones at different lengths. As one specific example, the maintenance model(s) may determine a lawn cutting pattern for a given area for a given day based on a machine learning model that is trained on a data set comprising date information, mow-area information (e.g., mow area shapes, sizes, attributes, etc.), and cutting patterns. Thus, the maintenance model(s) may be able to make intelligent selections on lawn cutting patterns without requiring a human operator to make manual selections for each area.

Once patterns and other maintenance attributes have been selected (either manually or by artificial intelligence and/or machine learning models), the systems and methods described herein facilitate the execution of corresponding mow or maintenance operations with minimal or no human involvement. For example, a defined area may be mowed according to a selected lawn cutting pattern without the exact mow-path being defined by an operator. The maintenance model(s) may be stored on a server and may be transmitted to a lawn maintenance machine via a network.

An example embodiment of the maintenance model(s) described herein may include one or more computer programs which include or otherwise use (1) environmental data; (2) mapping data; (3) weather data; (4) lawn design data; (5) maintenance data; and/or (6) plant health data, and which use a predictive model service to control the various operations of a lawn maintenance machine to select and perform the mow operations and other various lawn care operations. The predictive model service uses inputs, such as image data from a camera system, data from a number of databases, and so on, and one or more machine learning models to autonomously control a lawn maintenance machine. In this way, the predictive model service can use real-time data (e.g., a live camera feed) to control the lawn maintenance machine during a lawn maintenance process (e.g., lawn cutting). By using the predictive model service, lawn maintenance procedures can be performed without relying on manual user input or control.

Though the maintenance model(s) may afford fully autonomous operation of a lawn maintenance machine, in some cases a comprehensive system for turf maintenance and/or management includes techniques for remote supervision, monitoring, and, optionally, remote control, of the lawn maintenance machines. For example, lawn maintenance machines as described herein may be communicatively coupled to a remote computing system or device (e.g., a server), and one or more human operators may use the server to supervise, monitor, and/or control the lawn maintenance machine, as well as perform other tasks related to managing multiple mow operations and/or multiple lawn maintenance machines (e.g., as may be the case for golf courses or other areas that require significant lawn or turf care). For example, the server may allow the user to monitor mowers and optionally remotely control some or all functions of the mower (e.g., if the mower encounters an error condition). As another example, a user may use the server to establish and/or schedule mow operations, including selecting mowing start times and dates and patterns for given areas. The server may then cause the mow operations to be executed in accordance with the user selections, including, for example, issuing appropriate commands to one or more mowers to initiate the scheduled or requested mow operations.

In order to facilitate human supervision, monitoring, and/or control of a lawn maintenance machine, a user may utilize a computer system to initiate a connection with a lawn maintenance machine. In such an instance, a server may be used to establish a connection protocol between the operator's computer system and the lawn maintenance machine (and/or the user may access the server directly). The computer operations, such as remote control operations, may be performed on any one of, or a combination of, the server, the lawn maintenance machine, and/or the user's computer system. Though a computer system is described above, any suitable electronic device may be used. For example, a user may establish a connection with a lawn maintenance machine with a cellular phone, a tablet computer, a headset, a terminal, or any such device. In some embodiments, a computer system may be provided in addition to a server. A computer system may be a personal computing device, such as a desktop computer, and may be connected to a centralized server via, for example, a network connection.

While mow operations may be scheduled by a user using the server, the scheduling need not establish a specific time or day for the mowing operation. Rather, the user may simply request that an area be mowed when the maintenance model(s) determine it is appropriate to do so. The maintenance model(s) may use machine learning to determine the appropriate date and/or time to perform the mow operation. The machine learning, which may be part of or provided by a predictive model service, may use inputs such as a length of the grass to be mowed (as determined by one or more cameras, manually inputted data, growth predictions based on historical weather data and mow history, or the like), the current weather, weather predictions, the current seasons, or the like. In the case of golf courses, the predictive model service may also take into consideration course hours, duration until an upcoming event, scheduled course closures, reserved tee times, and the like.

Ultimately, the physical mowing and lawn care operations may be performed by a lawn maintenance machine or mower. A lawn maintenance machine as described herein may include a system controller, where the system controller includes systems for controlling movement of the lawn maintenance machine and for controlling maintenance components and/or mechanisms (e.g., a grass cutting blade and a fertilizer spreader) of a lawn maintenance machine. The lawn maintenance machine may be configured to communicate with and/or be controlled by the remote computing device or server, as described herein. For example, a server may issue commands to the lawn maintenance machine that cause the lawn maintenance machine to initiate mow operations. Such a command may specify an area to be mowed and may include a command to immediately initiate the mow operation (or a time at which the machine should initiate the mow operation).

The lawn maintenance machine may include a number of cameras facing in a variety of directions such as, for example, forward, backwards, and downwards, and a number of sensors. The number of cameras may capture static image data (e.g., still photographs of visible and/or hyperspectral light) and/or dynamic image data (e.g., videos of visible and/or hyperspectral light), referred to herein as "image data." As used herein, image data may include static images, dynamic images, or combinations of static and dynamic images. After capturing the image data, the image data may be provided to a predictive model service. The predictive model service may, for example, use the image data to determine a path that the lawn maintenance machine will travel along, to determine whether a lawn requires water, fungicides, herbicides, pesticides, fertilizer and/or other chemicals/treatments, and/or to avoid obstacles in the path of the lawn maintenance machine. The predictive model service may be executed by the lawn maintenance machine itself, or by the server, or by a combination of the lawn maintenance machine and the server (or other suitable remote computing device or service).

The predictive model service may use models trained using machine learning techniques, and may be configured to navigate the mower along a path without requiring manual user control. In an example, real-time environmental data from the cameras and/or other sensors may be provided to the predictive model service, and the predictive model service may use the environmental data as inputs to machine-learning-based models that make real-time decisions about navigation, obstacle avoidance, throttle, and/or steering of the lawn maintenance machine. In this way, the lawn maintenance machine incorporates artificial intelligence and machine learning to complete a lawn maintenance job without direct user control and/or predetermined job programming.

The lawn maintenance machine may be controlled autonomously, or by remote human operation. If a user takes control of the lawn maintenance machine, the user may use input devices (e.g., a mouse and keyboard, a game controller, a virtual- or augmented-reality headset, a mobile phone, and an electrical device) via a server to monitor the lawn maintenance machine's environment/status and direct the movement of the lawn maintenance machine. The remote human operator may control all aspects and mechanisms of the lawn maintenance machine or only a subset of the aspects and mechanisms. For example, in some cases the remote human operator takes control only of the steering, the throttle, and the brakes, while other operations (e.g., cutting height) remain autonomously controlled. In other cases, the remote human operator takes control of the steering, throttle, brakes, and other operations (e.g., blade status, cutting height, dispensing systems, etc.). On the other hand, if the lawn maintenance machine is to be controlled autonomously, the system controller of the lawn maintenance machine—which may execute the predictive model service—may have control of the lawn maintenance machine and may direct the lawn maintenance machine to, for example, travel along a path and cut grass without requiring a human operator. The autonomous control may include, for example, setting an acceleration or velocity value for the mower; cutting grass at a specified length; setting a turning radius; spraying water, herbicides, fungicides, pesticides, fertilizer, and/or other chemicals; avoiding obstacles; stopping operations due to weather and/or mechanical breakdowns; and the like.

The system controller (e.g., using a computer system onboard the mower) may execute the predictive model service, which may include algorithms, models, or other software components that are trained using machine learning techniques. Various types of machine learning techniques may be used to train the predictive model service (and/or the models of the predictive model service), and the particular technique used to train the model may depend, at least in part, on the type of turf being maintained. For example, in cases where the predictive model service is used to control the mowing of a fairway, the predictive model service may use models trained by, for example, supervised learning techniques. In cases where the predictive model service is used to control the mowing of a "rough" area (e.g., outside the fringe or fairway), the predictive model service may use models trained by, for example, deep reinforcement learning algorithms. As described herein, training the predictive model service using deep reinforcement learning techniques may include simulating a virtual mower in a virtual environment, where certain actions are incentivized or disincentivized.

In some cases, the system controller may use different predictive model services for different types of cutting operations, such as a first predictive model service (e.g., trained using supervised machine learning) when mowing a fairway, and a second predictive model service (e.g., trained using deep reinforcement learning) when mowing a rough. The predictive model service may use inputs such as image data and sensor data, and produce outputs such as throttle and steering commands, blade height commands, and the like.

The predictive model service may be additionally configured to provide anomaly detection. For anomaly detection, the predictive model service determines conditions that may impede a lawn mowing operation or may otherwise trigger an error condition that impairs normal function of the lawn maintenance machine. Anomalies may include, for example, downed branches, water hazards, hydraulic leaks, oil pressure issues, and clogged reels and/or blades. These anomalies may be detected by a number of sensors, for example, LIDAR, vision-based detection systems, acoustic sensors, RADAR, and the like, which may be coupled to the lawn maintenance machine and communicatively coupled to the system controller and/or the server via a network.

At the conclusion of a maintenance operation (e.g., after mowing an identified area), the disclosed methods and systems may prepare a report detailing actions that were undertaken and possible issues that may arise during future maintenance procedures. For example, if a golf course was mowed, a report may include the length of the mowing procedure, any obstacles encountered, and whether any turf-health procedures need to be performed. The report may also include details of the lawn maintenance machine, such as oil, gasoline, and air pressure levels, and may include predicted or suggested maintenance tasks or schedules (e.g., suggested oil change date). The predictions or suggestions may be determined using machine learning techniques, as described herein.

As noted above, in some cases, lawn maintenance machines may be configured for remote human operation. For example, if a lawn maintenance machine encounters an obstacle or unknown circumstance, the lawn maintenance machine may request remote human operation. To facilitate remote human operation, information about the environment around the lawn maintenance machine may be sent to a remote system (e.g., the server 130 or any other computer system associated with a remote operator). In some cases, the information sent to the remote operator may include video feeds from one or more cameras of the lawn maintenance machine; spatial information from sensors on the lawn maintenance machine (e.g., LIDAR, vision-based detection systems, acoustic sensors, RADAR, or the like); spatial information derived (by the lawn maintenance machine) from video or still images captured by the lawn maintenance machine; or the like. The information that is sent to the remote system may be used to provide a visualization, for the remote operator, of the environment around the lawn maintenance machine. For example, a three-dimensional environment may be generated and displayed to a user so that the remote operator can see a representation of the actual physical environment surrounding the lawn maintenance machine. The remote operator may view the three-dimensional environment via a display, a virtual- or augmented-reality headset, or other suitable display technology. In some cases, the remote operator may be provided with a first-person perspective view, such that they see what an operator would see if they were operating the lawn maintenance machine in-person.

The remote operator may control one or more aspects of the lawn maintenance machine (e.g., steering, throttle, brakes, grass-cutting blade speed/position, or other operations of the lawn maintenance machine) while using the three-dimensional environment as visual feedback. As used herein, the three-dimensional environment relates to the spatial information of the objects in the environment, and not necessarily to a manner of display. Thus, the three-dimensional environment may be displayed to an operator in a three-dimensional display format (e.g., via a virtual- or augmented-reality headset), or in a two-dimensional display format (e.g., on a conventional computer display). Where it is displayed in a two-dimensional display format, the remote operator may navigate (e.g., maneuver the lawn maintenance machine) in the three-dimensional environment in a manner similar to player-character movement in, for example, a video game.

The information from which the three-dimensional representation of the environment is produced may be sent over a network (e.g., the Internet) from the lawn maintenance machine to the server 130 or other computer system associated with the remote operator. For example, in embodiments where cameras are provided on a lawn maintenance machine, video information may be transmitted from the lawn maintenance machine to a server (e.g., the server 130) or other computer system associated with a remote operator. In embodiments where the lawn maintenance machine includes sensors such as LIDAR, vision-based detection systems, acoustic sensors, RADAR, or the like, information about physical objects and/or the physical environment (e.g., three-dimensional object maps) may be transmitted from the lawn maintenance machine to a server (e.g., the server 130) or other computer system associated with a remote operator. Such information may be referred to as "spatial information" throughout the disclosure.

Due to a communication delay (e.g., latency) between a transmission of the spatial information from the lawn maintenance machine to the server (or other computer system), the spatial information may be received by the server after the spatial information was captured by sensors on a lawn maintenance machine (e.g., potentially up to several seconds after the spatial information was captured). In addition to potential communication latency, delays resulting from the capturing of spatial information and from image and/or video processing/rendering may also occur. For example, if a 3-D representation of an area surrounding a lawn maintenance machine is to be generated for displaying to a human operator, the time spent by a server generating the 3-D representation may increase the delay between the time that the spatial information is captured and the time the processed spatial information is ultimately displayed to the remote human operator (e.g., as a 3-D representation). Because the remote operator relies on the spatial information from the lawn maintenance machine as visual feedback during control of the lawn maintenance machine, these delays may result in the user providing control commands based on outdated spatial information. For example, if it takes two seconds to capture and send spatial information to the remote operator and to process the spatial information for display to the remote operator, the remote operator may be acting on spatial information that is no longer accurate. Thus, for example, if the remote operator commands the lawn maintenance machine to turn left based on the presence of an obstacle that is one second ahead of the lawn maintenance machine (based on the current speed of the lawn maintenance machine), the command may reach the lawn maintenance machine only after the lawn maintenance machine has already collided with the obstacle.

To rectify the potential issue of delay due to latency and/or processing times (e.g., from information capture and/or visual rendering), techniques for predictive visual feedback may be provided. According to embodiments discussed herein, predictive systems may utilize, for example, spatial information from a lawn maintenance machine to predict a real-time position or condition of the lawn maintenance machine. As a non-limiting example, a processing time and latency may combine to create a delay of two seconds between the time at which the spatial information is captured and when the spatial information is finally processed and displayed to the remote operator. That is, the three-dimensional environment displayed to the remote operator would actually have occurred two seconds in the past. To account for these delays (e.g., data transmission latency and processing delays), systems described herein may predict the location of the lawn maintenance machine, as well as other objects in the three-dimensional environment, two seconds into the future. In this way, predictive visual feedback systems may estimate a real-world location and operation of a lawn maintenance machine and of other objects in a three-dimensional environment by accounting for data transmission latency and/or processing delays. In some embodiments, the spatial information (e.g., a video feed) may be used to predict what will happen in a time period equivalent to the total delay between when the spatial information is captured and when it is finally displayed to the user. This prediction may be referred to as a predictive offset. The predictive offset may use machine learning and predictive techniques to estimate what is likely to occur in the future (e.g., relative to the received spatial information). In this way, control of a lawn maintenance machine may be based on predicted real-world, live conditions, rather than outdated conditions.

In some embodiments, the latency and/or delay may be used as an offset time and may be directly linked to the predictions of the locations and motions of objects in the three-dimensional environment. Continuing the non-limiting example from above, a delay may be two seconds. A lawn maintenance machine (e.g., a lawn maintenance machine 100) as described herein may measure and/or estimate the delay and may (e.g., with a server or other computer system) generate a predicted three-dimensional environment—which is ideally representative of the real-time location and operation of a lawn maintenance machine along with surrounding environmental features and/or objects—based on spatial information, two seconds in the future as compared to the received spatial information. In some embodiments, the delay may be dynamic and may change during an operation of a lawn maintenance machine (e.g., as communication latency changes). Accordingly, the lawn maintenance system may continually measure and/or predict the delay (e.g., communication latency, processing delays, and the like) and use the continually updated delay (e.g., measured and/or estimated in real-time) when generating the predicted three-dimensional environment. In such embodiments, a smoothing factor may be provided so that predictive data does not jump erratically.

In some embodiments, and to reduce a delay and to limit bandwidth, only changes in an environment may be transmitted to a server. For example, if a 3-D environment is generated, the lawn maintenance machine may send information about objects that have changed locations/positions (e.g., a given object has moved a certain distance along a certain direction), instead of sending a comprehensive object map (e.g., complete specifications of the locations/positions of all of the objects in a three-dimensional environment). In this way, the amount of data that needs to be sent from the lawn maintenance machine to the server in order for the server to generate the three-dimensional environment for display to an operator may be reduced and/or minimized.

Similarly, instructions relating to control of a lawn maintenance machine may be generated and transmitted as changes (e.g., deltas) with respect to preceding instructions. For example, if a lawn maintenance machine is currently traveling at 15 miles-per-hour and an instruction changing the speed to 10 miles-per-hour is generated, a change in speed (e.g., reduce speed by 5 miles-per-hour) may be generated rather than a speed overwrite (e.g., set speed to 10 miles-per-hour).

The three-dimensional environment may include any and all physical features and/or objects that are proximate the lawn maintenance machine. For example, the three-dimensional environment may include trees, water features (e.g., ponds, lakes, rivers), geographical features (e.g., ravines, hills, valleys, cliffs), landscape features (e.g., paths, sidewalks, streets, flowers, different types/lengths of turf), plants (e.g., trees, bushes), people, animals, and the like. The locations and motions of these physical features and/or objects may be determined using sensors and/or imaging systems on the lawn maintenance machine, as well as by referencing a map using an absolute location of the lawn maintenance machine. For example, sensors and/or imaging systems on the lawn maintenance machine can determine the locations, relative to the lawn maintenance machine, of transient objects such as people, animals, and vehicles, which may be included in the three-dimensional environment based on the sensor/image data. The sensors and/or imaging systems on the lawn maintenance machine may also determine trajectories, motion vectors, or other movement-related information of objects (e.g., people, vehicles, animals) to help predict the future locations of the objects. In some cases, more permanent features (e.g., trees, buildings, geographical features) may be included in the three-dimensional environment based on a map of known features and the lawn maintenance machine's known location (e.g., GPS-determined coordinates). In some cases, objects that are included in the three-dimensional environment based on predetermined map data are checked or confirmed with sensor and/or imaging data, and if there are any discrepancies, the sensor and/or image data is used instead of the stored location information.

These and other embodiments are discussed below with reference to FIGS. 1-14. However, those skilled in the art will readily appreciate that the detailed description given herein with respect to these Figures is for explanatory purposes only and should not be construed as limiting.

FIG. 1 shows a schematic representation of a lawn maintenance system 100, including a lawn maintenance machine 110, a network 120, and a server 130, such as described herein. The lawn maintenance system 100 may use cloud computing techniques to facilitate the various processes, methods, and techniques described herein. Cloud computing is a type of Internet- or network-based computing in which multiple resources are hosted by a centralized entity and are made available to a variety of authorized users. In the lawn maintenance system 100, the lawn maintenance machine 110 may be connected to the network 120 by direct (e.g., wired) and/or indirect (e.g., wireless) communication. The lawn maintenance system 100 may also include the server 130 connected to the network 120 by direct and/or indirect communication. The server 130 may include any number of electronic devices, such as a desktop computer, a mobile phone, a computer onboard the lawn maintenance machine 110, a tablet, a network-enabled hard drive, and/or any combination thereof.

A user may interact with the server 130 to interact with, control, or instruct the lawn maintenance machine 110, including to establish or initialize autonomous operation, and/or to manually operate the lawn maintenance machine 110 remotely. For example, a user may load software onto the server 130, which the server 130 then uses to control a movement and/or operation of the lawn maintenance machine 110. After receiving information and/or instructions from the server 130, via the network 120, the lawn maintenance machine 110 may perform a lawn maintenance operation. For example, the lawn maintenance machine 110 may navigate to a start point of an area to be mowed, cut the grass within the area at a specified length, and/or administer fungicides, herbicides, pesticides, fertilizer and/or other chemicals within the area to be mowed.

In addition to receiving information and/or instructions from the server 130, the lawn maintenance machine 110 may also send information to the server 130. For example, the lawn maintenance machine 110 may include at least one camera (as described with respect to FIG. 2) and capture image data from an environment. The image data may then be received by the server 130, and the server 130 may use the image data as inputs to a maintenance model (as described with respect to FIG. 3). The maintenance model may provide outputs which may then be sent back to the lawn maintenance machine 110 and may change an operation of the lawn maintenance machine 110. For example, the server 130 may execute a predictive model service that takes image data as inputs and uses a machine learning-trained model to generate outputs. The outputs (e.g., commands or other data that control the operation of the lawn maintenance machine 110) may then be sent, via the network 120, to the lawn maintenance machine 110 and the outputs may control an operation of the lawn maintenance machine 110. In an example, the outputs of the predictive model service may serve to navigate the lawn maintenance machine 110, may initiate maintenance (e.g., grass cutting) operations, and/or may avoid obstacles. Though the predictive model service may be executed by the server 130, in other cases the predictive model service may be executed by the lawn maintenance machine 110, and the image data (or other inputs to the predictive model service) may be provided locally to the predictive model service, without having to be sent via the network 120. Local execution of the predictive model service (e.g., on the lawn maintenance machine 110) may enable faster and more responsive control of the lawn maintenance machine 110. Further details about the predictive model service are described below, with respect to FIGS. 3-8.

In some embodiments, a computing system 140 may additionally be provided in the lawn maintenance system 100. The computing system 140 may be connected to the lawn maintenance machine 110, the server 130, and/or other systems, via the network 120 (which may be or may include wireless and/or wired connections, and may include or be implemented as/on computer networks such as local area networks (LANs), wide area networks (WANs), the Internet, etc.). The computing system 140 may be as non-limiting examples, a desktop computer; a laptop computer; a smart phone; a tablet computer; an electronic watch; and so on. The computing system 140 may include a display and may display a graphical environment to a user, such as a simulated (and optionally predicted) environment. In some embodiments, the computing system 140 may include or be operationally coupled with headsets (e.g., virtual reality headsets), input/output devices, displays, sensors, and so on.

The computing system 140 may further include any number of computer components such as one or more processors or one or more memory devices. In some embodiments, the server 130 may include stored program files (e.g., one or more applications) and may transmit operations of the program files to the computing system 140 (e.g., as a data stream). In some embodiments, the computing system 140 may receive user inputs (e.g., at a keyboard, touchscreen, or mouse) and may transmit the user inputs (and/or commands or other information based on the user inputs) to at least one of a lawn maintenance machine 110 or a server 130. As described herein, the computing system 140 may be configured to display a generated environment (e.g., a predicted environment). In some embodiments, user inputs may be provided directly to the server 130 (e.g., remote operations of the lawn maintenance machine 110 may be provided by a user interacting with the server 130 directly).

Figure 2:
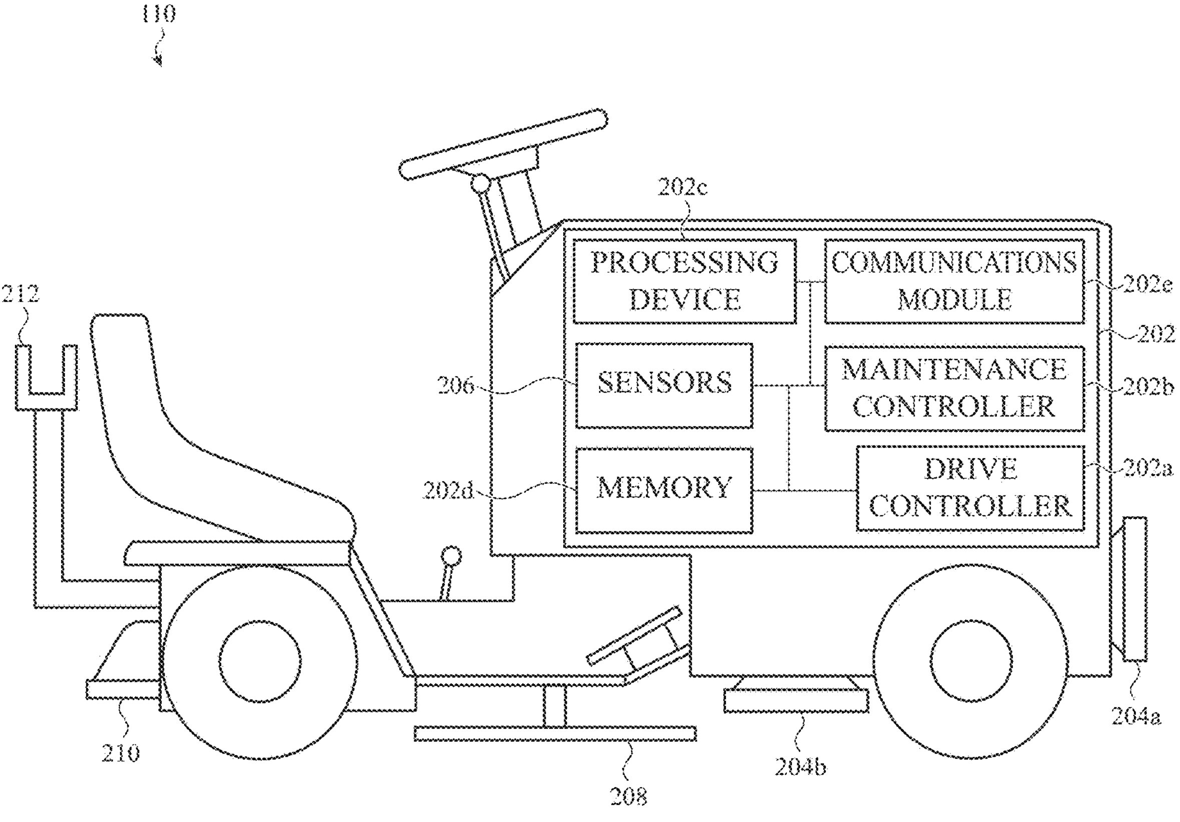
FIG. 2 is a schematic representation of a lawn maintenance machine and associated systems, such as described herein.

FIG. 2 shows a schematic representation of the example lawn maintenance machine 110, such as described herein. The lawn maintenance machine 110 may be provided with a system controller 202 that controls the operation of the lawn maintenance machine 110, at least one forward-facing camera 204*a*, at least one downward-facing camera 204*b*, and one or more sensors 206 for gathering environmental information. The lawn maintenance machine 110 may additionally be provided with a grass-cutting blade 208, a spreader 210, and an articulable robotic arm 212. The grass-cutting blade 208 may be disposed underneath the lawn maintenance machine 110 (or behind or at any other position relative to the lawn maintenance machine 110). The grass-cutting blade 208 may be adjustable with respect to the lawn maintenance machine 110, so that grass may be cut at different heights. The grass-cutting blade 208 may also rotate at different speeds depending on the desired cut-height of areas of grass, the type of grass to be cut, and/or the surrounding terrain. For example, if the lawn maintenance machine 110 is to cut grass at a long-length, the grass-cutting blade 208 may be directed to rotate at a faster or slower speed. The grass-cutting blade 208 may be any suitable type of cutting blade, blade assembly, or mechanism, such as a rotary blade or reel blade. The grass-cutting blade 208 may be made out of any suitable material, such as a metal, a plastic, and/or a ceramic. The grass-cutting blade 208 may additionally consist of any other structure suitable for cutting turf.

The spreader 210 may include or be associated with a container of water, herbicide, fungicide, pesticide, fertilizer and/or other chemicals. The spreader 210 may be movable so as to disperse the various chemicals at a targeted location or area. The spreader 210 may be provided with a rotatable aerator where tines of the aerator may collect soil samples. The collected soil samples may be provided to the at least one downward-facing camera 204*b*. The at least one downward-facing camera 204*b* may take spectrographic measurements of the collected soil samples and may produce a high-quality soil map. The spreader 210 may be any suitable structure for dispersing a solid or liquid material. In an example, the spreader 210 may be a rotating blade for dispersing solid material. In another example, the spreader 210 may be a sprayer for dispersing a fluid or liquid.

The articulable robotic arm 212 may be located at a rear portion of the lawn maintenance machine 110. The articulable robotic arm 212 may be configured to grasp a flag from a golf hole and to replace the flag once a cutting procedure is completed (e.g., after a portion of the green surrounding the golf hole has been mowed). Though the articulable robotic arm 212 is shown at a rear portion of the lawn maintenance machine 110, the position of the articulable robotic arm 212 may be at any position on the lawn maintenance machine 110 (e.g., a top portion or a front portion). Other lawn maintenance accessories may also be provided on the lawn maintenance machine 110. Such accessories may include an aerator, for aerating a densely packed lawn, and/or a speaker for creating sounds to repel pests such as rodents or insects. As discussed in the preceding paragraph, an aerator may be combined with the downward facing camera 204*b* to produce spectrographic data of collected soil or other organic and/or inorganic matter. In an example, the other lawn maintenance accessories may include a laser for dispersing geese and/or rodents.

The lawn maintenance machine 110 may include, without limitation or express requirement, at least one motor (e.g., an electric motor or internal combustion motor), a number of wheels or tires, a steering system configured to manipulate the wheels to control the direction of travel of the lawn maintenance machine 110, an electrical system, and manual controls to facilitate manual operation (e.g., a steering wheel, pedals or other manipulations for brake and throttle operation, etc.). It may be appreciated that the lawn maintenance machine 110, such as described herein, can be implemented in any suitable manner. Further, the systems and methods described with respect to the lawn maintenance machine 110 may be applied to other types of machines, such as tractors, leaf/snow blowers, plows, spreaders, sprayers, and/or other suitable machines.

The system controller 202 may include mechanical and electrical components. The system controller 202 may include mechanisms for engaging controls of the lawn maintenance machine 110, as described herein. For example, the system controller 202 may be configured to control mechanisms such as steering, throttle, blades for cutting grass, spreaders for spreading fertilizer, and the like. The system controller 202 may include a drive controller 202*a* and a maintenance controller 202*b*. The system controller 202 may be executed, at least in part, by a computer system that includes a processor, memory, and any other suitable components. In some cases, the system controller 202 may be executed by a number of computer systems, including one or more computer systems that are remote from the lawn maintenance machine 110 (e.g., the server 130).

The drive controller 202*a* controls the features of the lawn maintenance machine 110 that relate to movement (e.g., braking, steering, and propelling), and the maintenance controller 202*b* controls the features that relate to lawn care (e.g., mowing, engaging and adjusting the mower blades, distributing fertilizer, aerating, etc.). For example, the maintenance controller 202*b* may control components or systems such as the grass-cutting blade 208, the spreader 210, and the articulable robotic arm 212. The maintenance controller 202*b* may also control any number of other lawn maintenance accessories. Further examples of lawn maintenance accessories may include a string trimmer, one or more speakers, lasers, or other devices to deter unwanted pests, an aeration device, and leaf/snow removal equipment (e.g., blowers and vacuums).

The lawn maintenance machine 110 may additionally be provided with at least one forward-facing camera 204*a*, at least one downward-facing camera 204*b*, and one or more additional sensors 206. The forward-facing camera 204*a* and the downward-facing camera 204*b* may provide visual information to a predictive model service, as will be discussed herein.

The forward-facing camera 204*a* provides visual data to the lawn maintenance machine 110 and, more specifically, to the system controller 202. The forward-facing camera 204*a* may capture image data of a real-world environment, which may allow the lawn maintenance machine 110 to avoid obstacles seen by the forward-facing camera 204*a* and/or establish a driving path based on captured image data. The forward-facing camera 204*a* may provide the image data to the system controller 202, which uses the image data as an input to the predictive model service. Based at least in part on the image data, the predictive model service produces an output that defines a path to be mowed (and/or produces direct commands to the steering, throttle, brakes, and cutting blade), and the system controller 202 controls the lawn maintenance machine 110 according to the outputted path. The forward-facing camera 204*a* may include in its field of view a portion of the turf that is in front of the lawn maintenance machine 110, representing the turf that the lawn maintenance machine 110 is about to drive over. The forward-facing camera 204*a* may be angled slightly downward or otherwise have a suitable field of view (and be mounted/angled appropriately) to ensure that it captures some of the turf in front of the lawn maintenance machine 110.

The downward-facing camera 204*b* operates in a similar manner as the forward-facing camera 204*a*, but, instead of capturing image data in front of the lawn maintenance machine 110, the downward-facing camera 204*b* captures images of the area below or directly in front of the lawn maintenance machine 110 (or otherwise in a generally downward direction, such as to capture a top-down view of an area of turf about to be driven over by the lawn maintenance machine 110 or that is already under at least a portion of the lawn maintenance machine 110). The downward-facing camera 204*b* (and/or a separate spectrometer device) may capture spectrographic information of a portion of turf that is below the lawn maintenance machine 110 or about to be driven over by the lawn maintenance machine 110. For example, the spectrometer may be a push broom style hyperspectral camera, and may be able to capture image data throughout the electromagnetic spectrum, such as in the visible, infrared, or ultraviolet frequencies. The spectrometer may be any type of spectrometer and may be able to perform reflectance spectroscopy, near infrared spectroscopy, any kind of hyperspectral spectroscopy, and the like.

Though only two cameras are shown and described with respect to FIG. 2, alternate embodiments may exist with any suitable number of forward-, rear-, down-, and side-facing cameras and/or spectrometers, and/or any combination thereof (including one or more individual cameras configured to capture image data in 360 degrees). The image data from any of the cameras may be sent to the system controller 202 and/or server 130 (see FIGS. 1 and 3) for use in the control of the lawn maintenance machine 110 (or to be used in reports or as inputs to other predictive model services, to be used in generating a predicted environment, or the like). The cameras on the lawn maintenance machine 110 may be any suitable cameras, such as HD cameras, 360-degree cameras, film cameras, digital cameras, or the like, and may have any suitable frame rate such as a frame rate of 30 frames-per-second (FPS) or above and any suitable resolution such as, for example, a pixel resolution of 256×256 or higher or a pixel resolution of 256×256 or lower.

The lawn maintenance machine 110 may additionally include sensors 206. Sensors 206 may gather environmental data and may provide the gathered data to the predictive model service, as will be discussed herein. Sensors 206 may include humidity sensor(s), temperature sensor(s) (e.g., a thermometer), heat/infrared (IR) sensor(s), accelerometer(s), barometric pressure sensor(s), visual sensor(s) (e.g., a light detector), acoustic/audio sensor(s) (e.g., a microphone), various vehicular sensors (e.g., sensors to detect clogged reels, oil pressure, tire pressure, fuel levels, battery charge levels, hydraulic leaks, and the like), light or radio detection and ranging systems (LIDAR/RADAR), spectrometers, hyperspectral imaging systems, and the like. Sensors 206 may provide data to the system controller 202 and/or server 130 (see FIG. 1) and may include data about the lawn maintenance machine 110 such as, for example, the status of various systems and/or mechanisms of the lawn maintenance machine 110. Sensors 206 may also provide data to the system controller 202 and/or server 130 that is used to generate predicted environments, as described herein. The status of the lawn maintenance machine 110 (e.g., of its systems and/or mechanisms) may be used to identify items that require maintenance or repairs, as well as to track and/or determine maintenance schedules.

Sensors 206 may also provide environmental data to other systems connected to the network 120. For example, sensors 206 may measure a moisture level of a lawn and may instruct an irrigation system to provide more or less water. In another example, sensors 206 may measure a current or future weather condition (via, for example, barometric pressure sensor(s)). In yet another example, acoustic sensors may determine whether pests (e.g., crows or moles) are present or may determine whether the lawn maintenance machine 110 is in acceptable working condition (e.g., excessive mechanical noise may be indicative of equipment malfunction). Though specific sensors 206 are described above, any suitable sensor, and any device(s) that operate in conjunction with a sensor to provide sensing functionality, may be present on the lawn maintenance machine 110. For example, lighting, such as flood lighting, may be provided on the lawn maintenance machine 110 in order to allow the forward-facing camera 204*a* to gather valuable visual information even when dark.

As noted above, the lawn maintenance machine 110 may use machine-learning techniques to facilitate autonomous control of the various functions of the lawn maintenance machine (e.g., navigation, lawn maintenance, etc.). To that end, the maintenance controller 202*b* and the drive controller 202*a* may include or execute predictive model services that autonomously control the lawn maintenance and/or drive operations of the lawn maintenance machine 110. The predictive model services may be or may use machine-learning trained models to determine how to operate the lawn maintenance machine 110 based on inputs provided to the predictive model service. For example, for navigation operations, the predictive model service may use image data from the cameras 204 (as well as data from any suitable sensors) as inputs, and apply a model that determines, using those inputs, where to steer the lawn maintenance machine 110, how fast to drive the lawn maintenance machine 110, and the like. Thus, the output from this particular predictive model service may include direct commands to the various electromechanical components that operate the steering, throttle, brake, etc., of the lawn maintenance machine, or it may be a path or waypoint that a separate navigation controller causes the lawn maintenance machine to navigate towards.

For lawn maintenance operations, the predictive model service may use image data from the cameras 204 (as well as data from any suitable sensors 206) as inputs, and apply a model that determines, using those inputs, when to engage and/or disengage a cutting mechanism, when and where to apply fertilizer or another substance, and the like. The output from this particular predictive model service may therefore include direct commands to the various electromechanical components that operate the cutting mechanism, fertilizer applicator, etc., of the lawn maintenance machine, or it may be commands that are issued to a separate controller that operates such components.

While the predictive model services for the drive and maintenance operations are described above as separate predictive model services, this is merely for illustration, and they may instead be combined into a single predictive model service. For example, a single predictive model service may accept as inputs image data and sensor data, and provide outputs that control both the drive and maintenance mechanisms of the lawn maintenance machine 110. Further, the predictive model services used by the lawn maintenance machine may use other inputs in addition to image and/or sensor data, such as but not including GPS data.

In some cases, the lawn maintenance machine 110 may be configured to use different predictive model services based, at least in part, on a characterization of the target area being mowed or treated. For example, if the lawn maintenance machine is mowing a fairway, the lawn maintenance machine may use one set of predictive model services (e.g., for drive and maintenance operations), whereas if the lawn maintenance machine is mowing a rough, the lawn maintenance machine may use a second, different set of predictive model services. By using different predictive model services for different types of mowing operations, the predictive model services may be better tailored to specific types of operations. For example, the predictive model service for driving a lawn maintenance machine in a fairway may be suited to a machine learning model that is trained using one type of training data or technique (e.g., supervised learning), while the predictive model service for driving a lawn maintenance machine in a rough may be better suited to a machine learning model that is trained using a different type of training data or technique (e.g., deep reinforcement learning). Thus, the various predictive model services, and the machine-learning models upon which they are based or that they use, may be tailored for particular lawn maintenance uses or applications (e.g., rough, fairway, and green mowing).

The system controller 202 may further be provided with a processing device 202*c*, memory 202*d*, and communications module 202*e*. The processing device 202*c*, together with an operating system, may execute computer code and use data to perform operations as described herein. For example, the processing device 202*c* may execute the predictive model service(s), described herein that use machine-learning models to perform lawn maintenance operations. The processing device 202*c* may be a single-chip processor or may be implemented with multiple components.

Computer code and data (including, for example, the predictive model services) may reside within memory 202*d*, which may be communicatively coupled to processing device 202*c*. Memory 202*d* may store data for use by the system controller 202. Memory 202*d* may be any non-transitory computer-readable storage medium. By way of example, memory 202*d* may include Read-Only Memory (ROM), Random-Access Memory (RAM), a hard disk drive, and a solid state drive. The computer code and data may also reside on a removable storage medium that may be loaded or installed onto the system controller 202 when needed. Removable storage mediums include, for example, CD-ROM, DVD-ROM, Universal Serial Bus (USB), a memory stick, and a Multi-Media Card (MMC).

Figure 3:
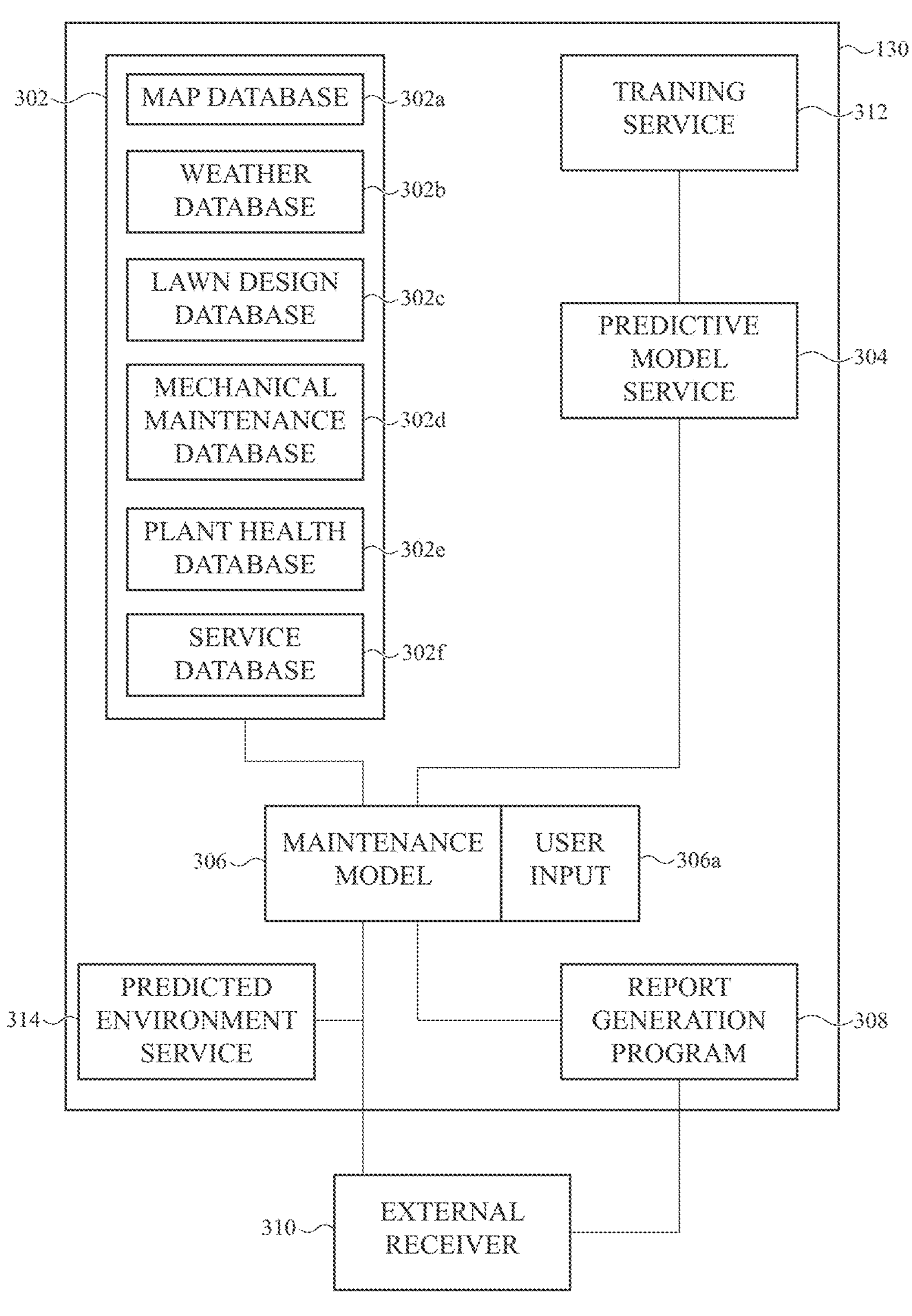
FIG. 3 is a schematic representation of a server and associated systems, such as described herein.

The communications module 202*e* may include one or more wireless interface(s) that are adapted to provide communication between the processing device 202*c* and an external device, such as the server 130 (FIGS. 1 and 3). The communications module 202*e* may include or be associated with antennas, communications circuitry, firmware, software, or any other components or systems that facilitate wired and/or wireless communications with other devices. In general, the communications module 202*e* may be configured to transmit and receive data and/or signals that may be interpreted by instructions executed on the processing device 202*c*. In some embodiments, the communications module 202*e* may be configured to send spatial information (detected by sensors, cameras, etc., of the lawn maintenance machine 11) to a computing system (e.g., the computer system 140) and/or server (e.g., the server 130). As described herein, the spatial information may be used to generate a predicted environment. Where wireless communications are used, the communications module 202*e* may communicate via radio frequency, optical, acoustic, and/or magnetic signals and may be configured to operate over a wireless interface or protocol. Example wireless interfaces include radio frequency cellular interfaces, fiber optic interfaces, acoustic interfaces, Bluetooth interfaces, infrared interfaces, USB interfaces, Wi-Fi interfaces, TCP/IP interfaces, network communications interfaces, or any other suitable communication interfaces.

The system controller 202 may include a global positioning system (e.g., GPS), and may be configured to use the GPS to facilitate certain navigation and movement functions. For example, location coordinates of the lawn maintenance machine 110 may be provided as inputs to a predictive model service, and the predictive model service may use the location data to determine the path along which the lawn maintenance machine 110 is to travel during a mow operation. In some cases, GPS coordinates may be used as target locations and/or waypoints for the lawn maintenance machine 110, and the lawn maintenance machine 110 may use a predictive model service to dynamically determine a path from a current location of the lawn maintenance machine 110 to the target or waypoint GPS location.

As described herein, areas to be mowed may be represented by bounded areas that are defined by GPS coordinates. The real-time GPS location of the lawn maintenance machine 110 may be used by the predictive model service, as the lawn maintenance machine 110 is mowing the area, to navigate within and along the boundary of the area. For example, as the lawn maintenance machine 110 is approaching a GPS-defined boundary during a mow operation, the predictive model service may compare the GPS position of the lawn maintenance machine 110 to the GPS coordinates of the boundary, and begin to modify the speed and/or steering direction of the lawn maintenance machine 110 (as well as make changes to a cutting blade or other lawn maintenance accessories) in anticipation of a turn or other maneuver. The turn or maneuver may mimic how a human operator would operate the lawn maintenance machine 110 during an approach to a mow area boundary. Notably, as described herein, the predictive model service may dynamically (e.g., in real-time and without predefined routines or paths) determine appropriate modifications to the speed, steering, and lawn maintenance accessories based on how the lawn maintenance machine 110 is approaching the boundary or is oriented relative to the boundary. Thus, the lawn maintenance machine 110 may operate differently when it is approaching a boundary perpendicularly versus at an oblique angle.

The lawn maintenance machine 110 may also use a GPS system to follow a predefined path that is defined, at least in part, by GPS coordinates. For example, a lawn maintenance machine 110 may receive a predefined path that connects a storage location (e.g., a garage) to an area to be mowed. The predefined path may include GPS waypoints (or other path data, such as a bounded corridor within which the lawn maintenance machine 110 may safely travel), and the lawn maintenance machine 110 may use a GPS location system to navigate along the predefined path.

The GPS system may also be configured to operate in conjunction with the sensors 206, the forward-facing camera 204*a*, and/or the downward-facing camera 204*b* of the lawn maintenance machine 110. In one example, the forward-facing camera 204*a* may capture images of a large boulder in front of the lawn maintenance machine 110. The image data from the forward-facing camera 204*a* may be provided to the predictive model service, which may navigate the lawn maintenance machine 110 around the boulder using the GPS system. In another example, the sensors 206 may detect low-quality patches of grass and mark a location of the low-quality patches using the GPS system. The data may be provided to the predictive model service and the lawn maintenance machine 110 may be directed to administer fertilizer to the affected patches.

The various mechanical and electrical systems and subsystems described with respect to FIG. 2 may either be integrated into a lawn maintenance machine at a time of initial manufacture, or they may be subsequently provided as part of a physical conversion kit. A physical conversion kit may include any suitable components to facilitate the autonomous operation of a lawn maintenance machine 110 as described herein. For example, a physical conversion kit may include a system controller 202 (which may be in an enclosure that may be mechanically coupled to the lawn maintenance machine), as well as components that interface with electrical and/or mechanical systems of the lawn maintenance machine. The physical conversion kit may also include various electrical connectors in order to facilitate interconnectivity with the lawn maintenance machine's own electrical subcomponents. A physical conversion kit may be powered by the lawn maintenance machine's own power source, or may be externally powered by, for example, batteries, grid power, alternators, and/or solar power.

In an example, the drive controller 202*a* may be configured to control the systems related to the movement of the lawn maintenance machine 110 (e.g., mechanisms that control braking, steering, and propelling). For instance, the drive controller 202*a* may control a motor that controls a steering mechanism (e.g., a steering wheel). The drive controller 202*a* may also control a throttle by controlling a mechanical throttle mechanism, a brake/acceleration pedal by controlling a mechanical pedal depressor, and/or a shifting mechanism by controlling mechanical shifting motors. In general, the drive controller 202*a* may control the physical mechanisms of the lawn maintenance machine 110. The physical mechanism may include motors, gear systems, electromagnetic clutches, linear actuators, or any other manner of mechanical control as understood in the art.

The physical mechanisms discussed in the preceding sections may include equipment originally present on the lawn maintenance machine 110 at the time of construction (e.g., OEM parts), may include retrofitted mechanisms integrated within the lawn maintenance machine 110 after an original manufacturing process, or any combination thereof. As an example of a retrofitted mechanism, a gear may be split into two parts to fit around a steering wheel and/or steering column of the lawn maintenance machine 110. The two gear parts may then be recombined around the steering wheel and/or steering column and may be mechanically coupled to a motor which possesses the perquisite torque to turn the steering wheel and/or steering column. As another example retrofitted mechanism, a throttle pedal depressor may include an actuator that depresses and/or raises the throttle pedal. A throttle pedal depressor may be coupled with any available pedal, such as, for example, a pedal for moving forward, a pedal for moving backward, a clutch pedal, and a brake pedal. The above examples are provided as non-limiting examples.

The maintenance controller 202*b* may operate in a similar manner as the drive controller 202*b* and may control physical mechanisms designed to initiate maintenance operations. As an example, the maintenance controller 202*b* may control a Power Take Off (PTO) clutch to engage and disengage the grass-cutting blade 208 on the lawn maintenance machine 110. In another example, the maintenance controller 202*b* may control an operation of the spreader 210 and the articulable robotic arm 212. In general, the maintenance controller 202*b* may control the physical mechanisms of the lawn maintenance machine 110 relating to maintenance. The physical mechanism may include a motor, a gear system, electromagnetic clutches, linear actuators, or any other manner of mechanical control as understood in the art.

The physical mechanisms controlled by the maintenance controller 202*b* may include equipment originally present on the lawn maintenance machine 110 at the time of construction (e.g., OEM parts), may include retrofitted mechanisms integrated within the lawn maintenance machine 110 after an original manufacturing process, or any combination thereof. In an example, the maintenance controller 202*b* may control a gripping mechanism, which may further include two opposing gripper jaws, a mechanical linkage which forces the gripper jaws open and closed, and a motor to drive the mechanical linkage. In such an example, the gripping mechanism may engage with and disengage with the PTO clutch through the operation of the motor. The above examples of mechanisms controlled by the maintenance controller 202*b* are provided as non-limiting examples. The maintenance controller 202*b* may also control electromagnetic clutches coupled to various controls, mechanical systems of various buttons and switches, or any other manner of remote control as understood in the art.

FIG. 3 shows a schematic representation of the server 130. The server 130 may include a number of programs and/or datasets, including a database 302, a predictive model service 304, a maintenance model 306, and a report generation program 308, which may operate in conjunction to control functions of the lawn maintenance machine 110 and perform other aspects of the lawn maintenance system described herein. The server 130 may include any number of electronic devices, such as a desktop computer, mobile phone, tablet, network-enabled hard drive, and/or any combination thereof. The server 130 may also include a computer that is located on the lawn maintenance machine 110 and is commutatively coupled with other computers (including optionally other mower-mounted computers wirelessly networked together). The programs and/or datasets loaded onto the server 130 may be programed within the server 130 or may be loaded onto the server 130 via wired or wireless transfer methods.

The server 130 includes a database 302. The database 302 may facilitate access to, and perform data transactions with, gathered data such as, but not limited to, a map database 302*a*, a weather database 302*b*, a lawn design database 302*c*, a mechanical maintenance database 302*d*, a plant health database 302*e*, and a service database 302*f*.

In some embodiments, the map database 302*a* is configured to store information related to geographical features of a certain area. The geographical features of an area may be a map, though they may include or encompass other information as well. Geographical features may be stored as an image, as text, as a modifiable program, or in any other format that may hold geographical information. Such geographical features may be created and uploaded by a user, may be obtained from a commercial service, or the like. The geographical features may be in the form of an overhead view (e.g., a satellite view), a perspective view (e.g., from a user's perspective), or in any other conventional form. In one example, the map database 302*a* may contain geographical information about a golf course. In this example, the map database 302*a* includes the overall layout of each hole on a golf course (e.g., the location and shape of a fairway, green, and rough, the location of the flag, and the location of each tee-box). Further, the map database 302*a* may include the location of natural objects such as, for example, trees, rocks, and bodies of water. In the event that the real-world layout of a golf course changes, the map database 302*a* may be editable by a user or through an automated process. The map database 302*a* may utilize GPS data (e.g., geographical features may be identified and/or represented by GPS coordinates).

The weather database 302*b* may include a history of past weather conditions and a prediction of future weather conditions. For example, the weather database 302*b* may gather and store information relating to the dates of past rainfall, dates of past snowfall, past wind conditions, and may store a weather forecast based on satellite and RADAR data.

The lawn design database 302*c* may also include target grass heights in various regions of an area to be maintained. For example, the lawn design database 302*c* may operate in conjunction with the map database 302*a* to store and/or determine the desired height of grass in certain zones (e.g., a "green" zone, a "fairway" zone, and a "rough" zone). The map database 302*a* may include the boundaries of these zones by, for example, creating virtual boundary markers (having GPS coordinates) encompassing each zone. The lawn design database 302*c* may store or establish certain rules based on each zone. For example, the lawn design database 302*c* may store or establish a rule that a "green" zone should have grass cut to 0.125 inches. Similarly, the lawn design database 302*c* may store or establish a rule that a "rough" zone should have grass cut to 2.5 inches. The rules stored in lawn design database 302*c* may additionally include rule subsets. For example, a rule for a "rough" zone may include height variations for certain holes (e.g., cutting the rough to 2.5 inches on hole 1 and cutting the rough to 2.3 inches on hole 2). Such rules may either be preloaded into the lawn design database 302*c* or may be added by any user with access to the database 302. In another example, the lawn design database 302*c* may communicate systems configured to determine turf-health, as discussed herein. In this way, the lawn design database 302*c* may establish rule exceptions allowing, for example, grass to grow at a longer length in the event that a fungal outbreak is detected or considered likely.

The lawn design database 302*c* may additionally include a variety of patterns that may be cut into turf. When cut, turf may exhibit a pattern dependent on the path of a lawn mower. One such pattern is a diamond, or checkerboard, pattern, where perpendicular lines are cut into the turf at a diagonal angle resulting in diamond shapes being visible on the turf. Another pattern is a parallel line pattern, where parallel lines run across the turf. These patterns, and any other pattern that may be cut into turf, may be created and stored within the lawn design database 302*c*.

In addition to the disclosed turf pattern and grass height information, the lawn design database 302*c* may also include rules for the operation of the lawn maintenance machine 110. In one example, the lawn design database 302*c* may include blade speed information for a grass-cutting blade. In this example, the grass-cutting blade may be programmed to have a lower speed for grass in a "rough" zone and a higher speed for grass in a "green" zone, or vice versa. In this way, the optimal blade speed may be stored in relation to different zones. In another example, the lawn design database 302*c* may include an optimal speed value for the lawn maintenance machine 110. In this example, the lawn design database 302*c* may include suggested speed values that are higher for a "fairway" zone and lower for a "green" zone, as a non-limiting example. While two examples are discussed here, the rules within the lawn design database 302*c* are not limited thereto. Lawn design database 302*c* may additionally include any rules to control the system controller 202 to affect turf aesthetic or design including, for example, a turning angle of the lawn maintenance machine 110, a power take-off clutch engagement duration, and so on.

The mechanical maintenance database **302*d* may store information related to the mechanical specifications of the lawn maintenance machine 110. Examples include, but are not limited to, oil age, oil operating temperature, gasoline level, turning resistance, grass-cutting blade rotational velocity, hydraulic fluid pressure, battery power, light bulb status, and tire pressure. The mechanical maintenance database 302*d* may operate in conjunction with the sensors 206 in order to capture and store such data. The data in the mechanical maintenance database 302*d* may be accessed or otherwise used by the server 130 and/or the lawn maintenance machine 110 to determine if maintenance is needed on the lawn maintenance machine 110. For example, the mechanical maintenance database 302*d* may include a suggested tire pressure of 14 psi. The system controller 202 may compare this suggested tire pressure with an actual tire pressure obtained from the sensors 206. If the actual tire pressure is below the suggested value of 14 psi, the system controller 202 may send a warning to the maintenance model 306 via the communications module 202*e*** and bring the low tire pressure to the attention of a user.

The plant health database **302*e* may include information about the optimal conditions of plant life (e.g., grass, trees, flowers, shrubs, and the like), as well as measured or detected information about the actual conditions of the plant life in a particular area that is being maintained by the system. In an example, the plant health database 302*e* stores the optimal moisture content of soil. In another example, the plant health database stores the optimal grass density. The plant health database 302*e* may operate in conjunction with the sensors 206 and the system controller 202. The sensors 206 may take periodic measurements pertaining to turf-health, such as grass density and soil moisture, and the system controller 202 may compare the measured values against the pre-generated values in the plant health database 302*e*. In the event that these values are different, the server 130 and/or the system controller 202 may instruct the lawn maintenance machine 110 to, for example, administer fertilizer via the spreader 210**.

The service database **302*f* may store information concerning specific jobs and clients. For example, the service database 302*f* may include instructions that define a "full-service" job that includes all of the tasks that the lawn maintenance machine 110 is capable of, a "grass-cutting" job that only includes cutting grass, and a "health diagnostic" job that determines the health of turf and trees. The service database 302*f* may include all the services that a service provider offers and may instruct lawn maintenance machines to carry out tasks in response to the service selected from the service database 302*f***.

The predictive model service 304 may use machine-learning trained models to determine how to operate the lawn maintenance machine 110 based on inputs provided to the predictive model service 304. As an initial matter, while the predictive model service 304 is described in this example as being part of the server 130, the predictive model service 304 may be stored on and executed by the lawn maintenance machine 110 (e.g., by the system controller 202), as described above.

Where the predictive model service is executed on the server 130, image, sensor, and other suitable data may be received from the lawn maintenance machine and provided as inputs to the predictive model service 304. The predictive model service 304 then generates outputs that are then sent, via a network (e.g., the network 120), to the lawn maintenance machine. The outputs, described above with respect to FIG. 2, may control operations of the lawn maintenance machine, including steering, throttle, brakes, cutting blade, fertilizer applicator, or the like.

The predictive model service 304 may be developed using the training service 312, which may include any hardware, software, or other circuit or processer or combination thereof configured to execute any suitable pattern recognition or classification algorithm, probabilistic model, artificial intelligence method, and untrained or trained learning models (e.g., supervised or unsupervised learning, reinforcement learning, feature learning, anomaly detection, and association rules). These learning models may utilize a single or any suitable combination of various models such as artificial neural networks, decision trees, support vector networks, Bayesian networks, genetic algorithms, generative adversarial networks, or training programs such as federated learning.

The training service 312 may be configured to run a number of simulations to create the predictive model service 304. In an embodiment, a virtual lawn maintenance machine and randomly- and/or manually-generated golf courses may be created and/or rendered in a three-dimensional (3-D) development platform. Additionally or alternatively, actual golf courses (e.g., maps of real-world golf courses) may be created or rendered in the 3-D development platform. The virtual lawn maintenance machine may be created utilizing real-world physics and may be based on a real-life maintenance machine, such as lawn maintenance machine 110. The virtual lawn maintenance machine may further be designed to move through the rendered golf courses with a random movement. In some cases, the movement of the lawn maintenance machine includes constraints or rules that guide its movement (e.g., limits on turning radius, limits on distance that the lawn maintenance machine will travel in reverse, etc.).

Alternatively, the virtual lawn maintenance machine may be created by rules that do not correspond to real-world physics. For example, friction and/or gravity values may be set to be greater than or lesser than respective real-world values. These fictional values may be dynamic, so that fictional values, corresponding to, e.g., friction and/or gravity, may change for successive simulations. By sweeping through a variety of fictional physical values, the virtual lawn maintenance machine may be better able to solve conditions arising for a number of previously-unforeseen obstacles. In addition, a virtual environment surrounding the virtual lawn maintenance machine may be created using fictional rulesets. In this way, a simulated camera positioned on the virtual lawn maintenance machine may receive image inputs that do not correspond to real-world image inputs. In this way, the virtual lawn maintenance machine may be trained with a variety of information and may learn how to navigate through a large number of encountered situations.

The virtual golf courses may be generated using or may otherwise include chunks. A chunk may correspond to a real-world hazard or texture. For example, a chunk may be a patch of medium-length grass, a patch of water, a tree, a rock, and a cart path. A number of these chunks may be stitched together using preset rules. An example of such a rule may be that medium-length grass chunks are stitched together in a manner that looks like a fairway of a real-life golf course and that long-length grass chunks surround the medium-length grass chunks. Each chunk may also include a "reward" or "punishment" value that the virtual lawn maintenance machine collects as it moves through the virtual environment. For example, a virtual rock may be worth −10 "points" and a medium-length grass chunk may be worth 5 "points." The point value of certain chunks may also change during the course of the simulation. For example, if the virtual lawn maintenance machine moves through a medium-length grass chunk for the first time, it may collect 5 "points," but if the virtual lawn maintenance machine moves through a medium-length grass chunk for the second time it may collect −3 "points." After a simulation is completed, the virtual engine may compile the collected points and provide the virtual lawn maintenance machine with instructions on how to increase its "score."

The virtual environment that the virtual lawn maintenance machine moves through may additionally be based on mapping data, such as that stored in map database 302*a*, of real-world golf courses. For example, map database 302*a* may store mapping information about hole 14 on a golf course. The training service 312 may upload this hole 14 to its training simulator and establish point values for certain terrain. The virtual lawn maintenance machine may then move through the uploaded course through multiple simulations and an optimal movement path may then be discovered and saved within the training service 312. The training service 312 may use the simulations to generate a model that corresponds to or is included in a predictive model service that autonomously controls the lawn maintenance machine during real-time mow operations. The virtual environment may also be created using generative models, and/or using portions of real-world map data. In an example, a virtual golf course may be created by stitching together a number of real-world golf courses such as, for example, Pebble Beach, Pinehurst, and Augusta National golf courses. Each virtual golf hole on the virtual golf course may correspond to a real-world golf hole on any real-world golf course and/or each virtual golf hole may be stitched together from portions of a real-world golf hole.

The training service 312 may also or instead generate a model for the predictive model service using supervised machine learning techniques. For example, the training service 312 may be provided with mow operation data that was recorded during multiple human-piloted mow operations. The mow operation data recorded from the human-piloted mow operations may include input data (e.g., images from cameras and sensors of a lawn maintenance machine), as well as output data (e.g., commands for steering, throttle, brake, cutting blade, and/or other mechanisms of the lawn maintenance machine). The training service 312 may apply machine learning techniques to process the mow operation data and generate a model that will accept real-time inputs (e.g., camera and sensor data) and produce real-time outputs (e.g., commands to the mechanisms of the lawn maintenance machine) without a human operator. As noted above, different models may be produced for different types of mow operations. Accordingly, the training service 312 may be provided with mow operation data from human-piloted fairway mowing jobs to generate a model to be used for autonomous fairway mowing operations, and it may be provided with mow operation data from human-piloted rough mowing jobs to generate a model to be used for autonomous rough mowing operations. Of course, a single model may be produced that can handle multiple types of mow operations, turf types, or the like.

After the training service 312 completes the training process, by, for example, running a number of simulations or analyzing recorded mow operation data, the training service 312 may create a model for use by the predictive model service 304, as described above. The model may be provided to the predictive model service 304 or otherwise used to generate the predictive model service 304. The predictive model service 304 may then use the model to autonomously control navigation of the lawn maintenance machine 110 by accepting inputs from the cameras (and/or other sensors) and producing outputs that define a path for the lawn maintenance machine. In some cases, the operation of defining a path for the lawn maintenance machine includes providing commands to the steering, throttle, and brake of the lawn maintenance machine to cause the lawn maintenance machine to drive along the path.

Though reward-based systems and supervised machine learning systems are discussed above, the training service 312 is not limited as such. Any suitable training method may be used by the training service 312 to develop or generate a model, for the predictive model service, to autonomously control operations of the lawn maintenance machine.

The maintenance model 306 may be configured to receive information from the database 302, the separate sub-databases present within database 302, and the predictive model service 304.

In particular, the maintenance model 306 may provide autonomous or semi-autonomous mowing operations to the lawn maintenance machine 110. The autonomous or semi-autonomous control model may be developed using the predictive model service 304. These developed rules may be incorporated, either in their entirety or a portion thereof, into the maintenance model 306 so as to control navigation, obstacle avoidance, and/or maintenance operations of the lawn maintenance machine 110. In one example, the predictive model service 304 may contain rules for the fastest way to traverse an entirety of a golf course for a lawn maintenance machine 110. This rule may be, for example, start a mow operation at a long-grass length area (e.g., a rough), continue to a medium-grass length area (e.g., a fairway), and finish on a short-grass length area (e.g., a green). In this example, this order-of-mowing rule may be provided to the maintenance model 306 and the maintenance model 306 may direct the lawn maintenance machine 110 to traverse an entirety of a real-world golf course in a similar manner.

The maintenance model 306 may incorporate information from the number of databases stored in database 302. For example, the maintenance model 306 may receive information from the map database 302*a* and may operate autonomous control based on received map information. For instance, a golf course stored in the map database 302*a* may include a large number of sand traps. The maintenance model 306 may analyze the golf course stored in the map database 302*a* and may select and/or modify a rule developed by the predictive model 304 in order to quickly and/or safely traverse the real-world golf course. In this way, the maintenance model 306 may initiate, modify, and/or control the operation of a lawn maintenance machine 110 by incorporating information stored in the database 302 with autonomous control developed by the predictive model service 304.

In another example, the maintenance model 306 may receive weather information from the weather database 302*b* and incorporate the received weather information with the rules developed by the predictive model service 304. For example, if the weather database 302*b* contains information expressing that a mow operation will be initiated when the turf is wet, the maintenance model 306 may initiate and/or modify a rule from the predictive model service 304 that establishes a mow operation suitable for wet turf (e.g., by establishing a lower speed of the lawn maintenance machine 110). The above examples are intended as non-limiting examples and an explanatory tool for how the maintenance model 306 operates. The maintenance model 306 may additionally direct the operation of maintenance procedures of the lawn maintenance machine 110 in a wide variety of ways (e.g., by instructing the lawn maintenance machine to administer fertilizer to a specific location, using information from the plant health database 302*e*). Thus, the maintenance model(s) may be able to make intelligent selections on lawn maintenance procedures without requiring a human operator to make manual selections for each area.

The maintenance model 306 may also identify unhealthy regions of turf using information stored in the plant health database 302*e*. For example, downward-facing camera 204*b* may take image data (e.g., visual or hyperspectral) of turf below the lawn maintenance machine. In response, the maintenance model 306 may compare the taken image data with data in the plant health database 302*e* and determine a poor turf-health location. The poor turf-health location may correspond to a detected health condition. For example, if image data shows grass with a pale or yellow color, a determination may be made that the grass is unhealthy and requires maintenance. In another example, fungi may be detected and a determination that a fungicide should be applied may be made. Based on these identifications, turf-health may be maintained. In this way, the maintenance model 306 may direct a spreader 210 to spread water, a fungicide, an herbicide, a pesticide, a fertilizer or another chemical to the affected turf region. As discussed herein, the downward-facing camera 204*b* may cooperate with the spreader 210 in order to take measurements of soil collected by the spreader 210.

The maintenance model 306 may also control a number of maintenance devices. For example, the maintenance model 306 may direct grass-cutting blades 208 to rotate at a fast speed when cutting grass to a longer length and may direct grass-cutting blades 208 to rotate at a slow speed when cutting grass to a shorter length. In another example, the grass-cutting blades 208 may be directed to rotate at a slow speed when cutting grass to a longer length and may be directed to rotate at a fast speed when cutting grass to a shorter length.

The maintenance model 306 may further include or interface with a user input module 306*a*. The user input module 306*a* may provide tools for a user to take direct control of the lawn maintenance machine 110. For example, the user input module 306*a* may include a peer-to-peer, low latency teleoperation software, such as Real-Time Communications (RTC) software, and may allow a user to directly control the movement and operation of the lawn maintenance machine 110. In this example, the user input module 306*a* may halt the autonomous operation of the maintenance model 306 and allow for direct user control.

The maintenance model 306 may further transmit program data to an external receiver 310. The external receiver 310 may be communicatively coupled with the lawn maintenance machine 110 and may transmit data and/or instructions to and receive data from the lawn maintenance machine 110, via the communications module 202*e*. In an embodiment, the external receiver 310 may be or may include a communications antenna and may be configured to send and receive data packets through wireless (e.g., WiFi) communications.

A predicted environment service 314 may additionally be provided and may be in communication with at least one of the external receiver 310, the maintenance model 306, and the user input 306*a*. The predicted environment service 314 may include an engine configured to generate a virtual environment (e.g., a graphical engine) and may be configured to receive spatial information from a lawn maintenance machine. For example, spatial information gathered from sensors may be used to generate a three-dimensional virtual environment. As discussed herein, with particular reference to FIG. 10, the predicted environment service 314 may be additionally provided with functions that serve to eliminate a perceived lag or latency due to a time delay. For example, the predicted environment service 314 may be configured to detect a latency between a lawn maintenance machine and a server/computing system and may predict an environment based on the detected latency. In some embodiments, the predicted environment service 314 may utilize spatial information and trends within the spatial information (e.g., past environment states, velocity values, directional values, etc.) to generate a predicted environment using the detected latency.

Each of the above modules, as described in FIG. 3, may be performed on a server (e.g., server 130), a computing system (e.g., computing system 140) or any combination thereof. In some embodiments, processing may be performed at a server while commands are received at a computing system and transmitted to a server. In some embodiments, the server and the computing system may be equivalent. As discussed herein, the server and computing system may share tasks associated with various functions, such as generating and display a virtual environment, operating a maintenance model, and so on.

It may be appreciated that the foregoing description of FIG. 3, and the various alternatives thereof and variations thereto, are presented generally for the purposes of explanation, and to facilitate a thorough understanding of various possible configurations of a maintenance engine, such as described herein. However, it will be apparent to one skilled in the art that some of the specific details presented herein may not be required in order to practice a particular described embodiment, or an equivalent thereof.

Figure 4:
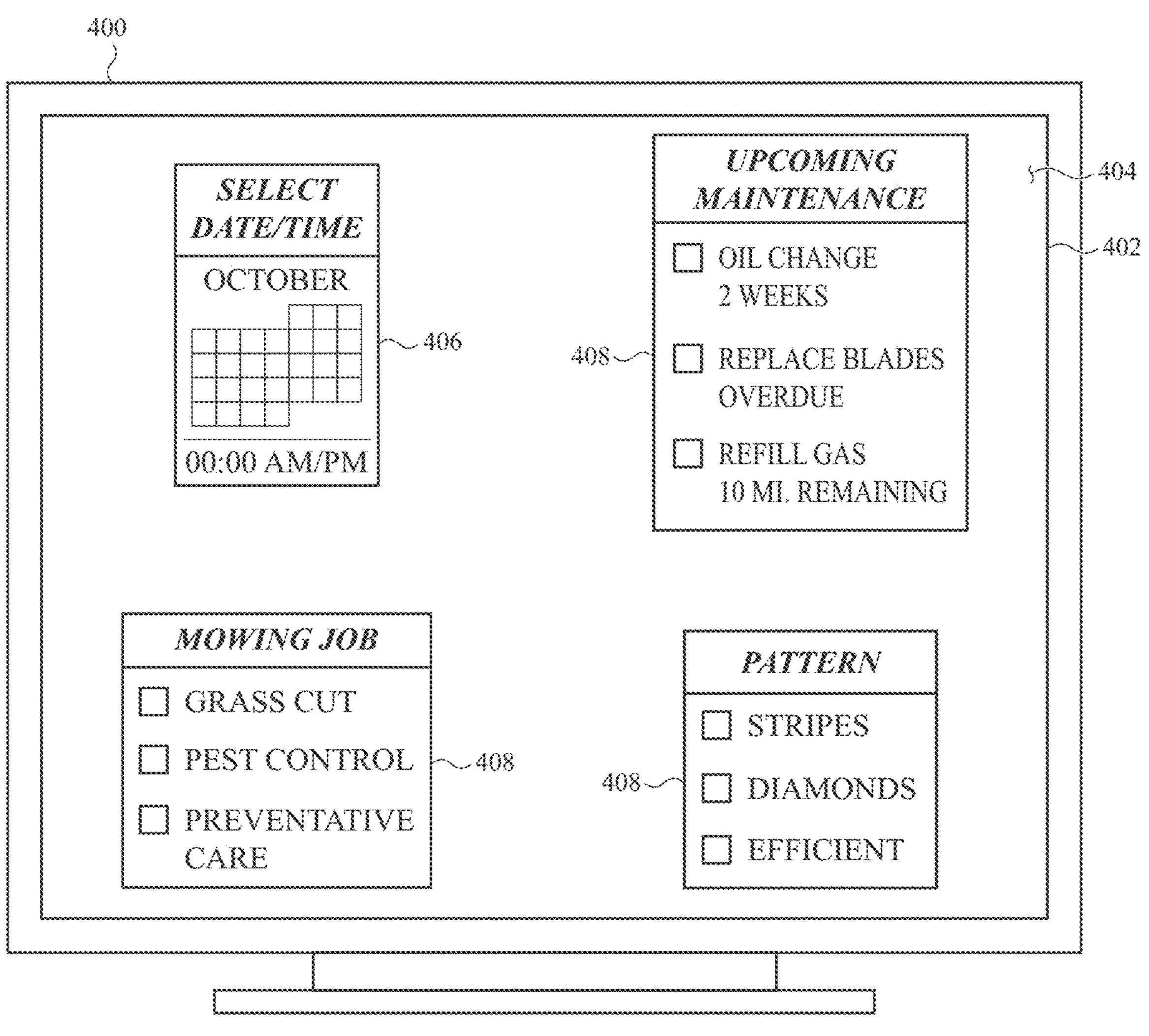
FIG. 4 is a schematic representation depicting a disclosed graphical user interface with user control elements, such as described herein.

FIG. 4 is a schematic representation of an example configuration of a graphical user interface (GUI) as seen by a user. In this embodiment, the client device 400 may be equipped with a display 402, an interface 404, a scheduler 406, and a number of maintenance selection input areas 408. In an example, a user interacts with the display 402 to view and interact with the interface 404. Further, the interface 404 may allow the user to access the scheduler 406 and the maintenance selection input areas 408. In this way, the user may control the time and manner in which the lawn maintenance machine 110 executes mow operations. For example, the user may type in or select a date and time of a future maintenance using the scheduler 406. The selected date and time may further be exported to a separate calendar or scheduling software and may set a time and date at which the lawn maintenance machine 110 is to perform a mow operation. The user may further interact with the maintenance selection input areas 408 in a similar fashion. For example, one of the maintenance selection input areas may include options for cutting a pattern into turf. The user may select one of the options for use in a future lawn maintenance operation. As another example, the user may select pre-loaded information from database 302 (see FIG. 3). Here, the user may select, for example, the course layout (e.g., map) of a golf course that a lawn maintenance machine will service at a future time. The above examples are non-limiting and any or all aspects of the lawn maintenance system 100 may be controllable by a user through the maintenance selection input areas 408. The scheduler 406 and the maintenance selection input areas 408 may be drop-down boxes, check-boxes, fillable boxes, or any other typical user interface models.

The GUI shown on the interface 404 may be executed by the server 130. The GUI may additionally be provided with controls for user control. For example, the GUI may include on-screen directional inputs and/or may include a button that a user may press to take direct control from an autonomous process. For example, the GUI may notify a user when the lawn maintenance machine experiences an error condition (see, for example, FIG. 6). After the error condition is presented on the GUI, the user may initiate direct control by, for example, pressing a button on the GUI. Image data from, for example, the forward-facing camera 204*a* may then be streamed and presented on the GUI via the network 120. The user may then remotely control the lawn maintenance machine 110 by using a virtual (e.g., on-screen directional icons) or physical (e.g., a game controller) control mechanisms. After an error condition is no longer present, the user may end direct control (e.g., by pressing a button) and autonomous control of the lawn maintenance machine 110 via the maintenance model 306 may be resumed.

FIGS. 5-8 depict flowcharts that correspond to various methods of a maintenance model operation, such as described herein, to perform one or more lawn care and/or vehicle maintenance functions. Though described with respect to autonomous control, the methods shown in FIGS. 5-8 may additionally be performed by partial autonomous control. In addition, the system as described herein may be configured to accept total user control via, for example, a remote computing device.

As with other embodiments described herein, the embodiments that follow reference an example configuration in which the maintenance model 306 is configured to mow and otherwise maintain and navigate around an outdoor environment. In particular, the embodiments that follow contemplate the autonomous control of a vehicle as it cuts grass within a golf course, but this is merely one example of a lawn or turf maintenance operation, and other lawn maintenance operations may be possible or undertaken by the lawn maintenance system, and may be performed at least in part using a predictive model service configured differently than those referenced in the following figures. For example, in addition to mowing, a vehicle could apply chemical pesticides and/or use mechanical methods for weed control. In another example, a vehicle could take environmental measurements of ambient humidity, turf moisture content, turf PH levels, etc. to determine the health of turf and plant life. In yet another example, a vehicle could deter pests (e.g., geese and moles) by creating noise via an engine or attached speakers or by utilizing mounted lasers. In another example, the vehicle could be programmed to locate golf balls (via, e.g., optical or RADAR sensors), geese waste, lost items (e.g., cell phones), and/or leaves and could be additionally programmed to collect and remove such materials. In another example, the gas waste from a vehicle could be captured and used in an insect (e.g., mosquito) trap.

These additional functions may be executed by using predictive model services that are trained using one or more machine learning techniques. For example, for weed control a predictive model service, trained by a training service, may be provided with image data from the lawn maintenance machine 110. The training service may train the predictive model service such that the predictive model service recognizes weed images in the image data. After recognizing a weed from the image data, the predictive model service may direct the lawn maintenance machine 110 to navigate to an area proximate the weed and to administer a pesticide via spreader 210. In another example, a predictive model service may be trained, via a training service, to recognize a flagpole on a green. The predictive model service may initiate an operation that directs the lawn maintenance machine 110 to navigate to a portion proximate the flagpole. The predictive model service may then direct the articulable robotic arm 212 to grasp the flagpole and hold the flagpole while the lawn maintenance machine 110 cuts grass around the hole in which the flagpole was placed. In another example, a predictive model service may be trained to recognize pests from image data. Once a pest is recognized, noise may be created via an engine or speakers to scare the pest away from the lawn maintenance machine 110.

Though various elements are described using the term "lawn," this word does not limit the disclosed apparatuses and systems to the maintenance of lawns. The disclosed apparatuses and systems may be configured to perform additional tasks not directly related to lawns, such as, for example, maintenance of trees, sand pits, stone or dirt pathways, parking lots, and pest removal. Various elements are additionally described using the term "unmanned lawn mower." As discussed herein, "unmanned lawn mower" may refer to the lawn maintenance machine 110 and/or lawn maintenance machine 1100, as described with respect to FIGS. 1 and 11.

Figure 5:
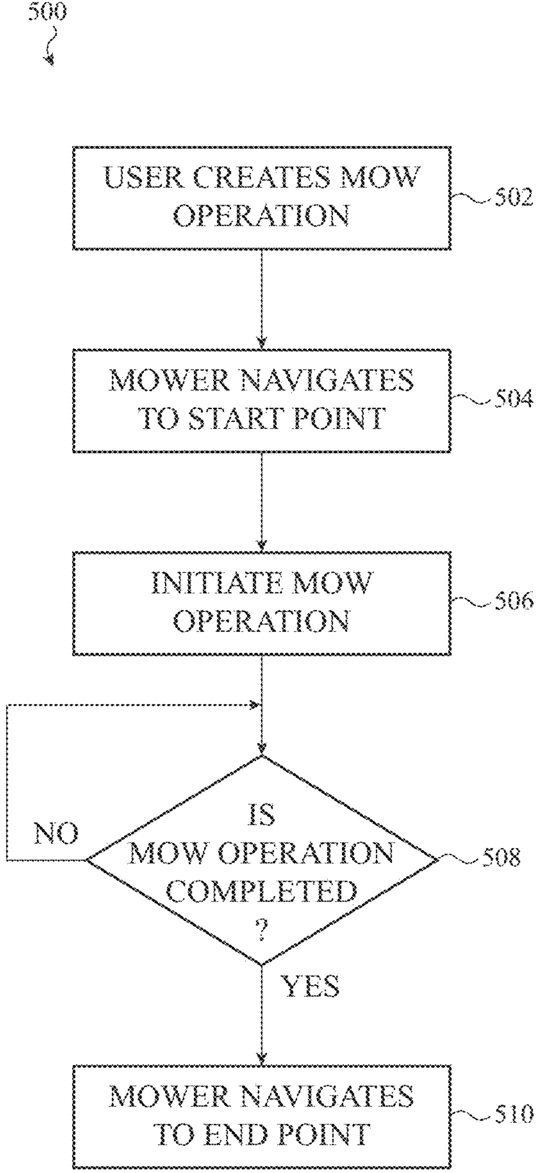
FIG. 5 is a flowchart of an example method of initiating and completing a turf maintenance job, such as described herein.

FIG. 5 shows a flowchart corresponding to a method of navigating an unmanned lawn mower. Aspects of the method 500 can be performed, in whole or in part, by any suitable service, server, processor, or other computational resource allocation associated with a maintenance model, such as described herein. For example, aspects of the method 500 can be performed in whole or in part by a predictive model service such as described above in reference to FIGS. 1-4. In one example, aspects of the method 500 can be performed by a server, such as a desktop computer and/or a cellular phone, and by mechanical components on an unmanned lawn mower. Method 500 may be performed entirely by an unmanned lawn mower, may be performed by an unmanned lawn mower in conjunction with a server (or another electronic device), and/or may be performed entirely on a server.

At operation 502 (which may be optional in some embodiments), the user interacts with a maintenance model in order to create a mow operation. At any point of the method 500, the unmanned lawn mower may receive a representation of an area to be mowed during the mow operation. The representation of the area to be mowed may include, for example, mapping data of a field as received from a map database. In some embodiments, the representation of the area to be mowed may be simulated in a computer system and a virtual mow operation may be performed to determine certain mow paths and/or operations.

To create the mow operation, the user may, for example, interact with the GUI of FIG. 4 to select a date/time of service, select a golf course, or number of golf courses, to be mowed, select a mowing pattern, and select a type of mow operation (e.g., "green," "fairway," "rough," and some combination thereof). The user may also establish a physical location as a "starting point" and another, or the same, physical location as an "ending point." Once the user selects all of the desired options, the user may complete the job creation process by, for example, pressing a virtual confirmation button. Once the job confirmation is received by the predictive model service, the predictive model service may transmit (e.g., via wired or wireless communication technologies) data concerning the job to an external memory source. In some embodiments, the external memory source may be a USB memory drive. In another embodiment, the external memory source may be a memory, such as memory 202*d*, on an unmanned lawn mower, such as lawn maintenance machine 110 (see FIG. 2).

At operation 504, an unmanned lawn mower navigates from an initial location to a mow operation start point. In some embodiments, an unmanned lawn mower may receive navigation commands from a remote operator and, in response to receiving the navigation commands, follow a first path to move from the initial location to the mow operation starting point. The first path may be at least partially defined by the navigation commands. More particularly, the remote operator may be a remote human operator who provides the navigation commands (e.g., steering, propulsion, and braking) to a computer or other electronic system (e.g., a server, a mobile phone, a client computer associated with a golf course, and a computer system located on the lawn maintenance machine 110) via wired or wireless communications to the unmanned lawn mower. In another example, the navigation commands may be provided by a predictive model service without direct user control. The unmanned lawn mower may drive autonomously from a parking location to the starting point by way of the predictive model service. As used herein, the mow operation start point may refer to a location where a mow operation begins or a location which the unmanned lawn mower navigates to after leaving an initial location (e.g., a garage and/or storage location).

At operation 506, a mow operation of an area to be mowed is initiated. The unmanned lawn mower may receive a command from a predictive model service that directs the unmanned lawn mower to initiate the mow operation. The mow operation may include engaging a cutting mechanism (e.g., a grass cutting blade) and receiving image data from a camera system attached to the unmanned lawn mower. As discussed herein, engaging the cutting mechanism includes, for example, beginning to spin the grass cutting blade of the unmanned lawn mower. The mow operation may further provide the image data as an input to a predictive model service. After the predictive model service makes use of the input data, the output from the predictive model service may be provided as part of the mow operation. This output may define at least a partial second path within the area to be mowed. The unmanned lawn mower may then be directed to navigate along the second path and the second path may define the path that the unmanned lawn mower takes while performing the mow operation. As used herein, the second path may be any path that an unmanned lawn mower travels along while in the area to be mowed and/or while performing a mow operation.

At operation 508, the unmanned lawn mower determines if the mow operation is completed. For example, the unmanned lawn mower may periodically query whether the mow operation is completed (e.g., when all tasks within the mow operation are finished). Upon determining that the mow operation is complete, the unmanned lawn mower may disengage the cutting mechanism and may return to the initial location at operation 510. After the end of the mow operation, a second mow operation may be initiated if other areas are to be mowed. The second mow operation may include substantially the same steps as the initial mow operation, but may occur in a different maintenance zone. After the mow operations are completed, the unmanned lawn mower may disengage the cutting mechanism and may return to the initial location at operation 510. Though operations 508 and 510 reference disengaging a cutting mechanism, it is understood that additional or alternative actions may be undertaken once the mow operation has concluded. For example, a speed of an unmanned lawn mower may be increased or reduced as the unmanned lawn mower is no longer performing a mow operation.

Figure 6:
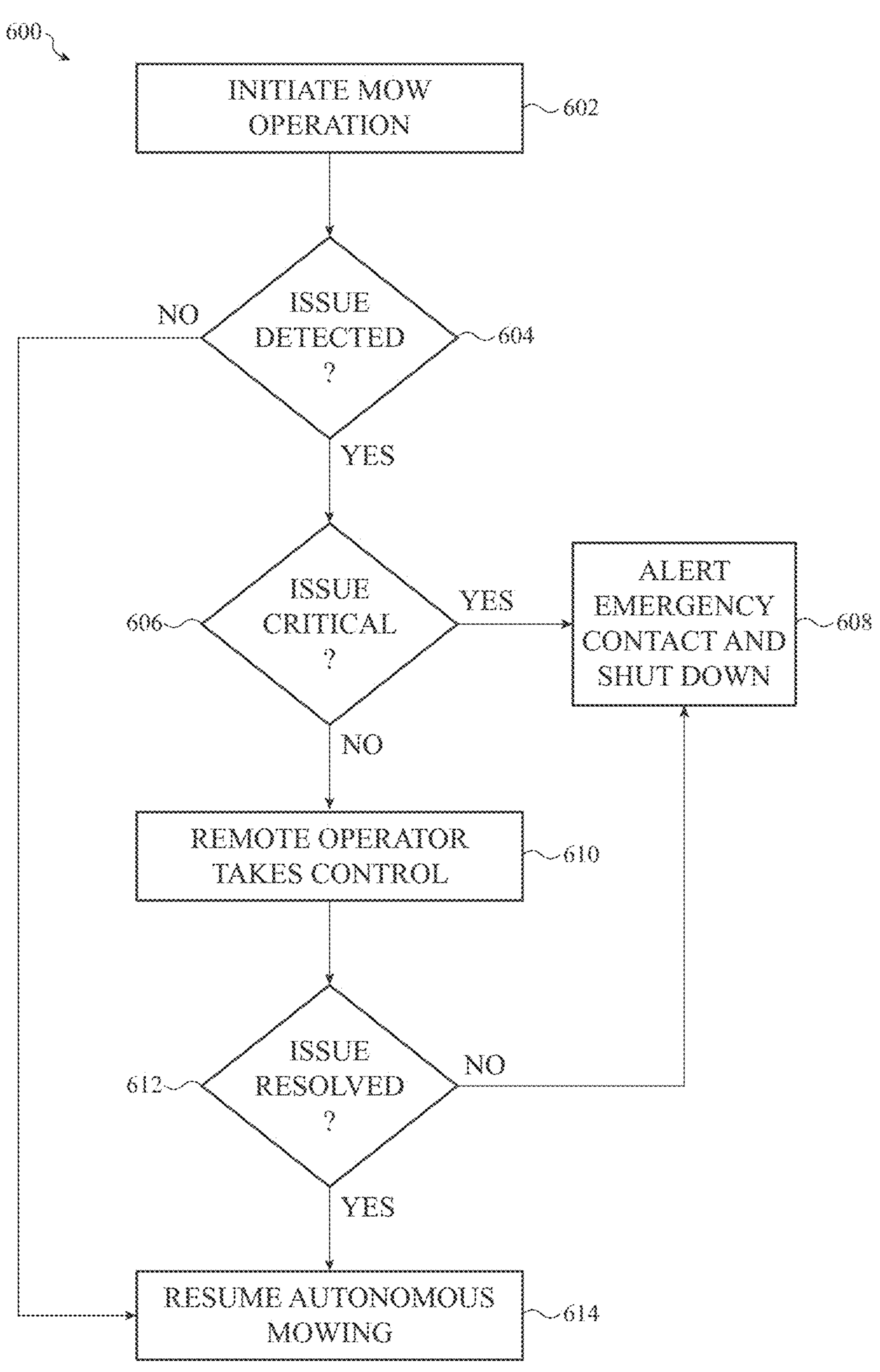
FIG. 6 is a flowchart of an example method of handling an issue detected by a lawn maintenance machine, such as described herein.

FIG. 6 shows a flowchart corresponding to a method of issue detection, avoidance, and correction. More particularly, method 600 may utilize the predictive model service as described herein to identify obstacles (via, for example, a camera system present on an unmanned lawn mower) and determine, in real-time, how to avoid or engage with the identified obstacles. As with method 500, aspects of the method 600 can be performed in whole or in part by a predictive model service such as described above in reference to FIGS. 1-4. In one example, aspects of the method 600 can be performed by a server, such as a desktop computer and/or a cellular phone, and by mechanical components on an unmanned lawn mower. Method 600 may be performed entirely by an unmanned lawn mower, may be performed by an unmanned lawn mower in conjunction with a server (or another electronic device), and/or may be performed entirely on a server. Aspects of the method 600 may be performed by a human operator, who may be monitoring the operation of the lawn mower.

At operation 602, a mow operation of an area to be mowed is initiated. Operation 602 may correspond to operation 506 as shown with respect to FIG. 5 and as described herein. As noted above, operation 602 may include an unmanned lawn mower being controlled autonomously. In this way, the unmanned lawn mower may operate according to a set of rules as defined in a maintenance model as described with respect to, for example, FIG. 3.

After the mow operation is initiated in operation 602, a determination of whether an issue was detected at operation 604 is made. For example, at step 604 an obstacle detection operation may detect, via image data, an obstacle. To detect an issue, an unmanned lawn mower may use a number of sensors and/or cameras as input(s) to a predictive model service to determine whether there is an interference and/or obstacle that may hinder the operation of the unmanned lawn mower. As an example, a forward-facing camera may capture an image of a large boulder in the path of the unmanned lawn mower. As another example, a downward-facing camera may notice the presence of bare soil. In another example, a sensor may measure a low tire pressure in a tire of the unmanned lawn mower. To determine whether an input captured by the sensors is a hazard, a predictive model service may be trained with real-world hazard data (see, e.g., FIG. 3). If the predictive model service, via the sensors and/or cameras, does not detect an issue, then the autonomous mowing is resumed at operation 614.

If the sensors do detect an issue, then a determination is made whether the issue is critical at operation 606. For example, the predictive model service may, in response to detecting an obstacle, determine a hazard value of the obstacle. To determine if the issue is critical, the predictive model service determines whether the sensed/captured obstacle has been determined critical via a training process. For example, the predictive model service may be trained, via multiple simulations, to overcome obstacles or to determine if the obstacle cannot be overcome. The predictive model service may also determine whether user intervention is required. The preceding is just one possible manner of determining whether an issue is critical and other conventional systems and methods may be used as well.

In some embodiments, the hazard value may be determined from image information and may correspond to a size, shape, and/or location of an obstacle. For example, a large boulder in the middle of a path may correspond to a large hazard value while a smaller rock away from the path may correspond to a low hazard value. Hazard values may be determined from previous modelling and may correspond to the likelihood that the obstacle will result in a critical issue. The likelihood may correspond to a threshold level, which may be established by a user or system. For example, a threshold level may be set to 80%. Thereafter, if the likelihood that the obstacle will result in an issue (e.g., a lawn mower cannot overcome the obstacle) is at or above the threshold level, then the issue may be determined to be critical (e.g., if the lawn mower has an 80% chance or higher of not overcoming the obstacle, then the issue may be critical). If the likelihood that the obstacle will not result in a critical issue is below the threshold, then obstacle avoidance navigation commands may be generated/received so that a lawn maintenance machine may avoid the obstacle. The provided threshold level of 80% is merely explanatory and any value may be used in accordance with the provided disclosure.

If the hazard value is sufficiently critical at operation 606, then operation 608, which alerts an emergency contact and shuts down an unmanned lawn mower, is initiated. The emergency contact may be anyone with physical access to the location of the unmanned lawn mower (e.g., staff at a golf course), or a remote operator who can view image data from the unmanned lawn mower's cameras and control the unmanned lawn mower remotely.

If the issue is determined to not be critical, then operation 610, which permits a remote operator to take control of the unmanned lawn mower, is initiated. Here, there is a determination that the hazard value satisfies a condition. Upon the satisfaction of the condition, the predictive model service ceases the navigation of the unmanned lawn mower along a path within the area to be mowed. As described above, the condition may reference a threshold level that a likelihood of a critical issue will occur and satisfying a condition may be a determination that the threshold level is not met. The predictive model service may then receive obstacle avoidance navigation commands from a remote operation so that an obstacle may be avoided. The remote operator may take control of the unmanned lawn mower via teleoperations, as described herein. While the remote operator controls the unmanned lawn mower in such a way as to avoid the detected obstacle, the unmanned lawn mower may learn how to avoid such obstacles in the future via a reward system or other training method, as described herein.

At operation 612, it is determined whether the issue was resolved in operation 610. If the issue is still perceived by the sensors, then operation 608 is initiated and the unmanned lawn mower is shut down and an emergency contact is alerted. Upon determining that an autonomous navigation restart condition has been satisfied, the remote operator relinquishes control to the predictive model service and the predictive model service continues navigating the unmanned lawn mower along the path within the area to be mowed. If the issue is not perceived by the sensors, then operation 614 is initiated and autonomous mowing is resumed, which may correspond to the remote operator re-engaging an autonomous mode of the predictive model service. The predictive model service may provide additional obstacle avoidance functionality. For example, a camera may detect image data of an obstacle (e.g., a boulder), the image data may be input into a predictive model service, and based on a machine-learning model within the predictive model service, the predictive model service may learn how to navigate around the obstacle, and therefore similar obstacles that the unmanned lawn mower encounters in the future.

The predictive model service may be used if an obstacle is above a certain hazard value and is deemed critical (as described above), or it may be used regardless of the severity of the obstacle. That is, the predictive model service may deal with any and all obstacles that it encounters.

Figure 7:
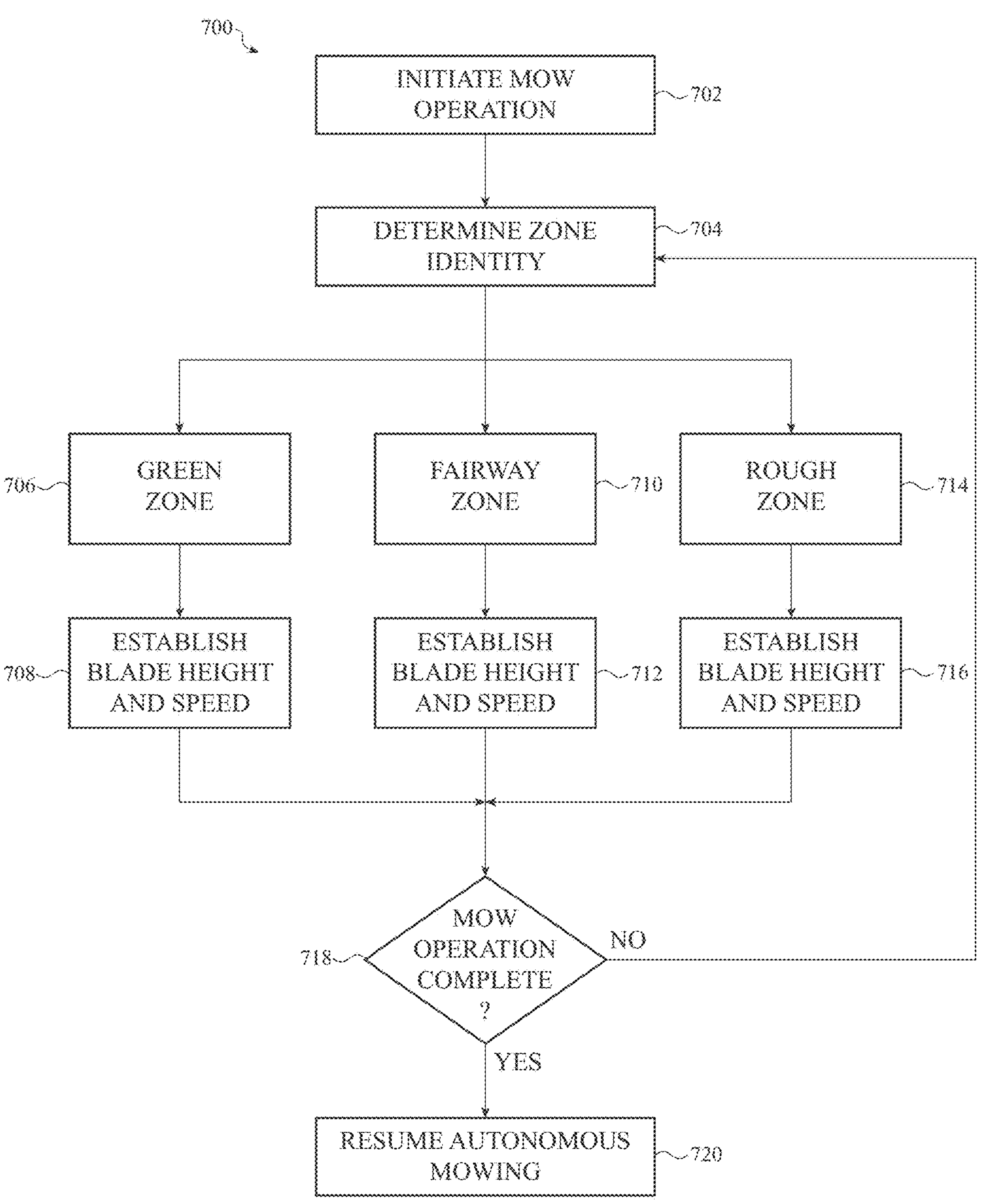
FIG. 7 is a flowchart of an example method of performing a variety of mowing scenarios along with autonomous control, such as described herein.

FIG. 7 shows a flowchart corresponding to a variety of mow operations and the manner in which a mow operation responds to environmental inputs. In this embodiment, a length of grass to be cut is determined and a cutting operation based on said length of grass is performed. In one example, aspects of the method 700 can be performed by a server, such as a desktop computer and/or a cellular phone, and by mechanical components on an unmanned lawn mower. Method 700 may be performed entirely by an unmanned lawn mower, may be performed partially by an unmanned lawn mower and a server, and/or may be performed entirely on a server.

At operation 702 a mow operation begins, as described herein. Operation 702 may correspond to operation 506 and/or operation 602 as shown with respect to FIGS. 5 and 6. Operation 702 may begin controlling a lawn maintenance device autonomously. In this way, the unmanned lawn mower may operate according to a set of rules as defined in a maintenance model as described with respect to, for example, FIG. 3.

At operation 704, a zone identity of the representation of the area to be mowed is determined. For instance, a predictive model service may receive a representation of an area to be mowed specifying a cutting height. For example, the representation of the area to be mowed may include information as to whether a length of grass is to be cut at a "short" level (e.g., on greens), a "medium" level (e.g., on fairways), or a "tall" level (e.g., on roughs). In an example, the unmanned lawn mower may use GPS and golf course map data to determine what grass-length zone the unmanned lawn mower is presently located in and perform the cutting procedure based on the targeted grass length.

At operation 706, a determination that the unmanned lawn mower is located in a green (e.g., short-length) zone is made. When the unmanned lawn mower is in the green zone, a cutting mechanism may be moved to a specified cutting height and a speed of the unmanned lawn mower may be changed at operation 708. The specified cutting height and the speed of the unmanned lawn mower may be set according to a set of parameters relating to an optimal mowing speed and/or an optimal cutting height of the unmanned lawn mower while in the specified zone. If the unmanned lawn mower is in a green zone, the grass-cutting blades may be raised, lowered, or sustained, the speed of the unmanned lawn mower may be raised, lowered, or sustained, the PTO clutch may be engaged or disengaged, and/or the system control device may be directed to change or sustain any controllable operation of an unmanned lawn mower.

At operation 710, a determination that the unmanned lawn mower is located in a fairway (e.g., medium-length) zone is made. When the unmanned lawn mower is in the fairway zone, a cutting mechanism may be moved to a specified cutting height and a speed of the unmanned lawn mower may be changed at operation 712. The specified cutting height and the speed of the unmanned lawn mower may be set according to a set of parameters relating to an optimal mowing speed and/or an optimal cutting height of the unmanned lawn mower while in the specified zone. If the unmanned lawn mower is in a fairway zone, the grass-cutting blades may be raised, lowered, or sustained, the speed of the unmanned lawn mower may be raised, lowered, or sustained, the PTO clutch may be engaged or disengaged, and/or the system control device may be directed to change or sustain any controllable operation of an unmanned lawn mower.

At operation 714, a determination that the unmanned lawn mower is located in a rough (e.g., long-length) zone is made. When the unmanned lawn mower is in the rough zone a cutting mechanism may be moved to a specified cutting height and a speed of the unmanned lawn mower may be changed at operation 716. The specified cutting height and the speed of the unmanned lawn mower may be set according to a set of parameters relating to an optimal mowing speed and/or an optimal cutting height of the unmanned lawn mower while in the specified zone. If the unmanned lawn mower is in a rough zone, the grass-cutting blades may be raised, lowered, or sustained, the speed of the unmanned lawn mower may be raised, lowered, or sustained, the PTO clutch may be engaged or disengaged, and/or the system control device may be directed to change or sustain any controllable operation of an unmanned lawn mower.

At operation 718, the unmanned lawn mower determines whether the overall mow operation is completed or whether there are more areas to be mowed. If it is determined that the mow operation is not complete, then the method 700 returns to operation 704 and a determination as to what grass-length zone the unmanned lawn mower is presently in or will be in is made. If it is determined that the mow operation is complete, then operation 720 is initiated. In operation 720, the unmanned lawn mower is brought to an ending location and the operation is ceased.

Generally, FIG. 7 relates to a predictive model service receiving a representation of an area to be mowed, including a first sub-area specifying a first cutting height and a second sub-area specifying a second cutting height. The first and second cutting heights may be different. The predictive model service may then determine a boundary between the first sub-area and the second sub-area and initiate cutting procedures based on whether the unmanned lawn mower is presently within the first sub-area or the second sub-area. For example, when the unmanned lawn mower is located proximate the first sub-area (e.g., within a threshold distance of the first sub-area (e.g., about 1 foot, about 2 feet, about 3 feet, or another suitable distance); inside the first sub-area; or the like) the cutting mechanism may be engaged at a first cutting height and when the unmanned lawn mower is located proximate the second sub-area (e.g., within a threshold distance of the second sub-area (e.g., about 1 foot, about 2 feet, about 3 feet, or another suitable distance); inside of the second sub-area; or the like) the cutting mechanism may be engaged at a second height. The speed of the unmanned lawn mower may be at a first speed while in the first sub-area and at a second speed, different from the first speed, while in the second sub-area.

Figure 8:
FIG. 8 is a flowchart of an example method of generating a report, such as described herein.
Figure 8:
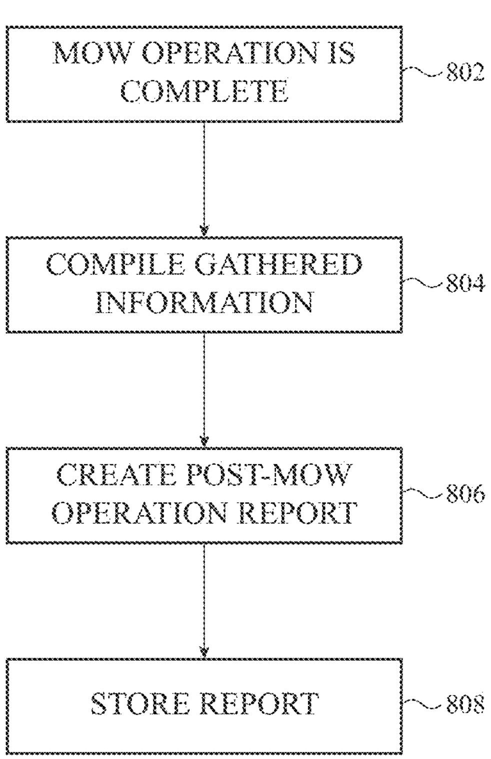

FIG. 8 shows a flowchart corresponding to a report generation process. In one example, aspects of the method 800 can be performed by a server, such as a desktop computer, a cellular phone, and an onboard computer on an unmanned lawn mower. Method 800 may be performed entirely by an unmanned lawn mower, may be performed partially by an unmanned lawn mower and a server, and/or may be performed entirely on a server.

The method 800 begins after a mow operation is completed at operation 802 as described, for example, with reference to FIG. 5. Information is then compiled by a variety of sensors at operation 804. Operation 804 may occur at any time following the completion of a mow operation. For example, operation 804 may occur right after a lawn maintenance machine reaches an ending point. The sensors that are gathering the data may be any type of sensor as described throughout. For example, lawn maintenance machine diagnostics, such as tire pressure, oil levels, scheduled maintenance, and so on, may be compiled by a computing system. As another example, visual information from cameras (e.g., the location of divots, weeds, downed branches, and dry spots), soil moisture content from a moisture meter, and acoustic data from pests may be compiled from sensor-gathered data.

At operation 806, a post-mow operation report is created. The post-mow operation report may be created using a report generation program and may include at least some of the information gathered by the sensors. The report may include raw numbers directly obtained from the sensors or may include graphs, formulas, and so on, that are calculated using the raw numbers. The report may include any information useful for running a golf course. For example, the report may include information on turf-health, including, for example, areas where plant disease is detected, areas where fertilizer and/or water is needed, and areas where general course maintenance is needed. The report may also include information about the diagnostics of a lawn maintenance machine. For example, the report may include a recommended oil change date, information about tire pressure, and so on.

At operation 808, a report is stored for user inspection. The report may be stored within a lawn maintenance machine in, for example, an onboard memory or may be transmitted to a server via wireless or wired transmissions to, for example, a server, a home computer, an electronic device, and/or an email server.

Figure 9A:
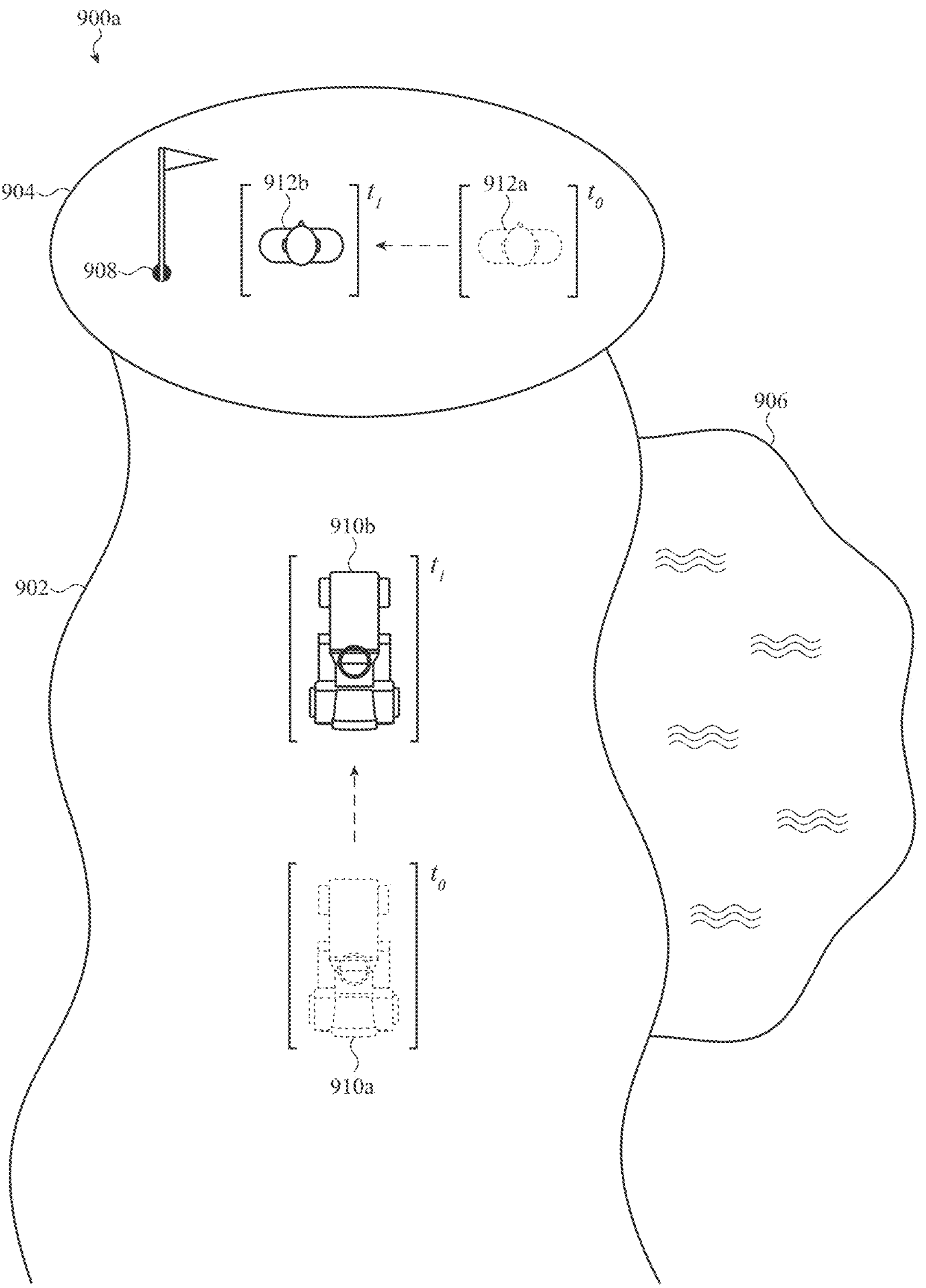
FIGS. 9A-9C illustrate overhead views of an example virtual environment generated using predictive techniques, as described herein.
Figure 9B:
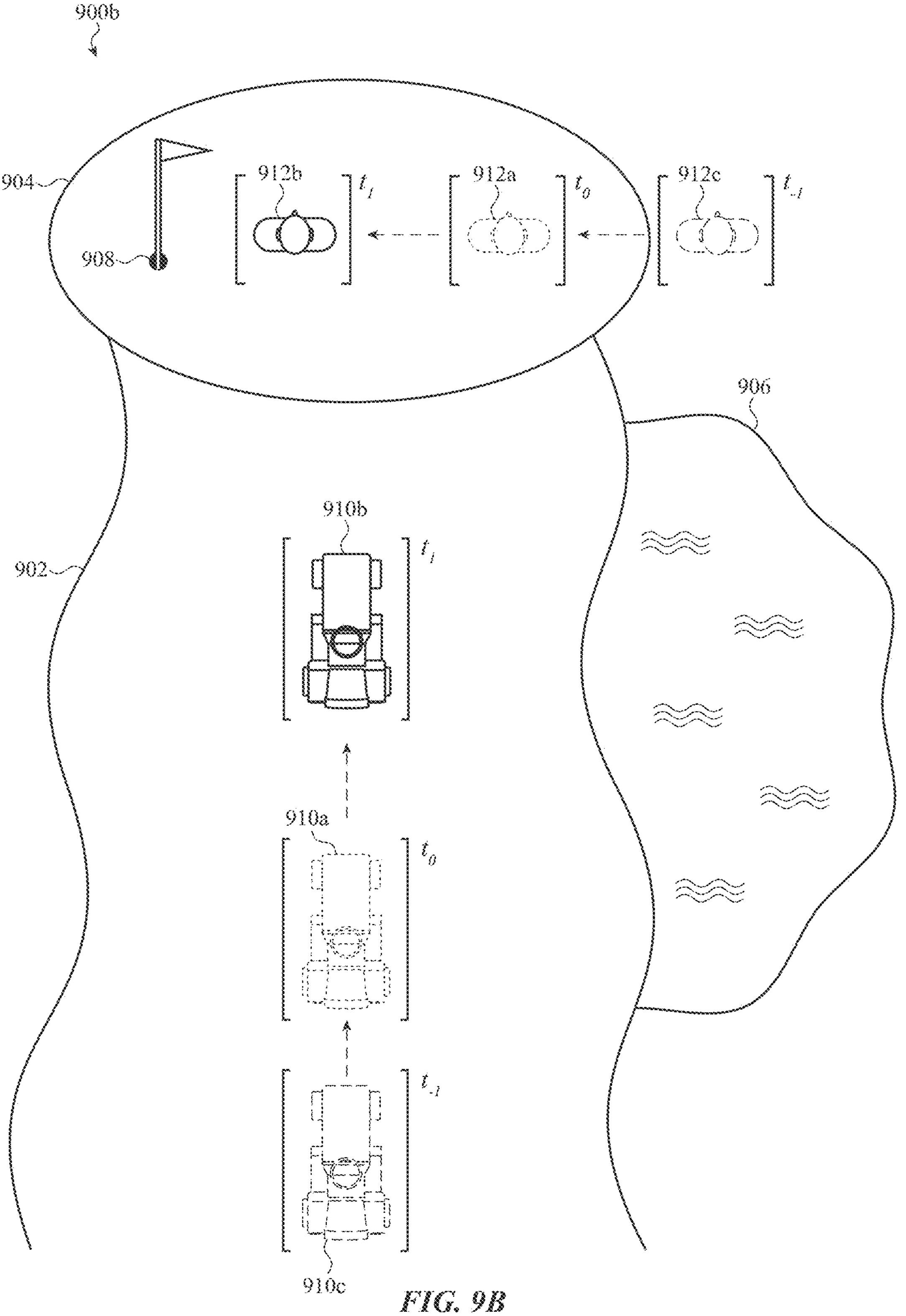
Figure 9C:
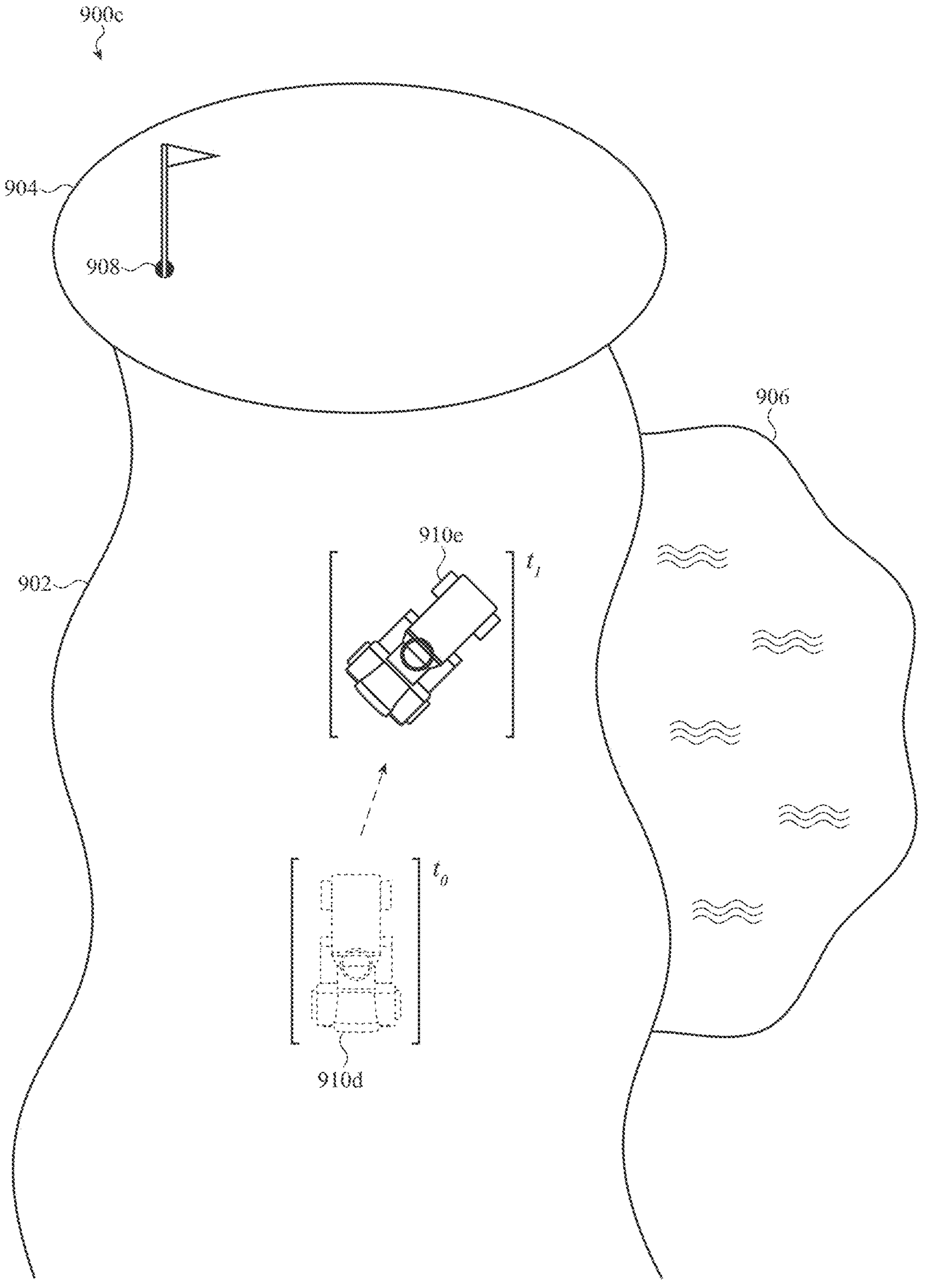
Figure 10:
FIG. 10 depicts a flowchart of an example of predictive control, such as described herein.
Figure 10:
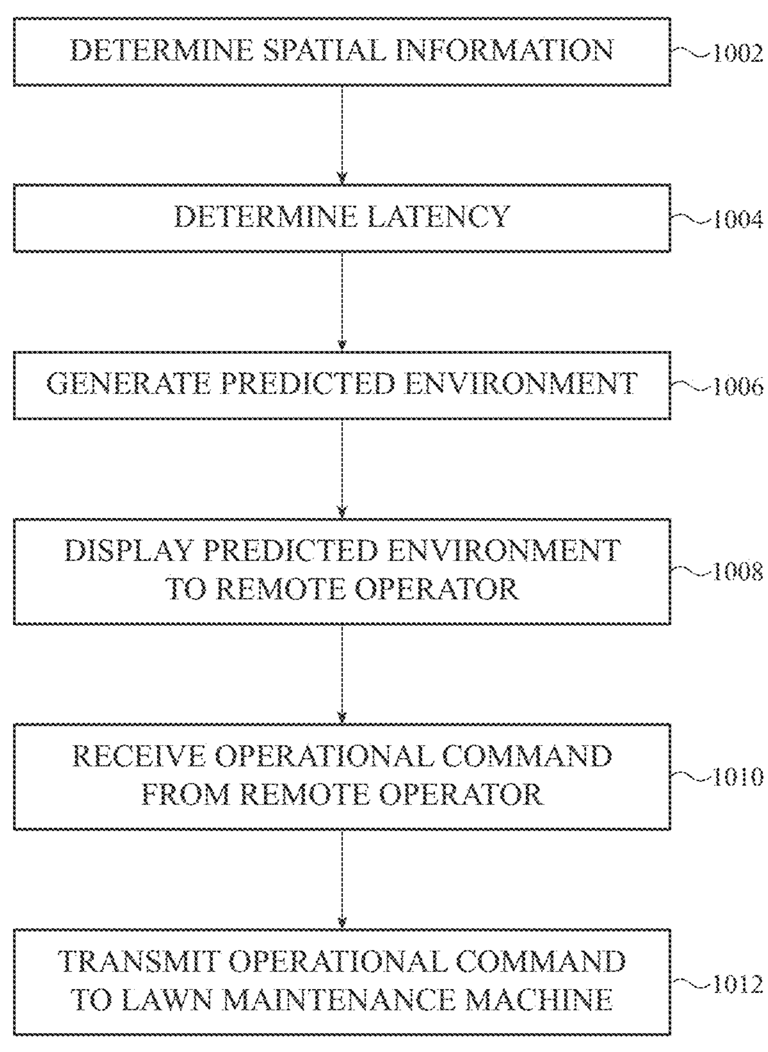

FIGS. 9A-10 reference an additional or alternative embodiment of predictive control based on a predictive offset. As discussed above, there may be a delay (e.g., latency) between capturing spatial information (e.g., image and/or sensor information) from a real-world lawn maintenance machine and receiving the spatial information at a server. There may additionally be a delay during a processing operation where, for example, the server generates a two-dimensional or three-dimensional virtual environment corresponding to the real-world environment around the lawn maintenance machine. In such situations, a delay may result in a user viewing expired data. That is, the image and/or sensor information may have been obtained a certain amount of time before being received/processed at a server and displayed to an operator.

To account for this latency and/or processing time, predictive visual feedback systems disclosed herein may serve to predict a real-time position and/or operation of a lawn maintenance machine based on spatial information. The amount of time in the future that is predicted may be referred to as a predictive offset and may be based at least in part on a measured latency value. For example, if a latency between a lawn maintenance machine and a server is two seconds, the predictive offset may also be two seconds. In some embodiments, the predictive offset may be equivalent to a latency and a processing time added together. In this manner, the system(s) can predict the real-time positions of the objects in the real-world environment and display those predictions in the form of a predicted environment (e.g., a predicted virtual environment) to the user.

Based on certain inputs, such as the last 'n' frames of camera and/or sensor input, the last 'n' user or autonomous actions, and so on, a prediction of where a lawn maintenance machine (and/or objects in the vicinity of the lawn maintenance machine) exists in real-time (e.g., in the future with respect to received information) may be obtained. This may be based on physical properties of the lawn maintenance machine and/or surrounding objects, such as estimated/detected speed, estimated/detected movement angle, estimated/detected acceleration, and so on, all of which may be estimated and/or detected in the last 'n' frames of camera and/or sensor input and/or the last 'n' user or autonomous actions (e.g., steering/throttle/brake settings). The resulting predicted environment may be displayed on, for example, a computer, a mobile device, a 3-D headset, and so on.

FIG. 9A illustrates an example overhead view of a virtual environment 900*a* (e.g., a virtual environment that is displayed to a remote human operator to facilitate remote operation of a lawn maintenance machine). Though FIGS. 9A-9C each illustrate an overhead view of a respective virtual environment; it is noted that this view is provided for ease of depiction only. In some embodiments, any view of a virtual environment may be provided to a remote operator such as, for example, a first-person view; an over-the-shoulder view; a view taken from a vehicle's perspective; and so on.

The virtual environment 900*a* may be generated in response to spatial information as received by sensors on a real-world lawn maintenance machine, such as described herein. In some cases, the spatial information may include still and/or video images from one or more cameras of a lawn maintenance machine, information from sensors on the lawn maintenance machine (e.g., LIDAR, vision-based detection systems, acoustic sensors, RADAR, or the like), information derived (by the lawn maintenance machine) from video and/or still images captured by the lawn maintenance machine, and the like. The spatial information may be used to generate the virtual environment 900*a* of the environment around the lawn maintenance machine.

In some embodiments, a remote operator may view the virtual environment via a display, a virtual- or augmented-reality headset, or other suitable display technology. In some cases, the remote operator may be provided with a first-person perspective, such that they see what an operator would see if they were operating the lawn maintenance machine in-person. The remote operator may control one or more aspects of the lawn maintenance machine (e.g., steering, throttle, brakes, grass-cutting blade speed/position, or other operations of the lawn maintenance machine) while using the virtual environment as visual feedback. The remote operator may navigate the virtual environment in a manner similar to player-character movement in, for example, a video game or virtual reality system.

As depicted in FIG. 9A, a virtual environment 900*a* around a virtual lawn maintenance machine 910*a* may be generated based on location/status information present in obtained spatial information (e.g., sensor data captured by the lawn maintenance machine). In addition to location/status information, spatial information (from which the virtual environment 900*a* is generated) may include characteristics of a physical property of a lawn maintenance machine such as speed, direction, turning angle, and so on. The location and/or other position/motion parameters of the virtual lawn maintenance machine 910*a* (e.g., relative to the other objects in the environment) may correspond to a time $t_0$. The time $t_0$ and objects associated with the time $t_0$, such as the virtual lawn maintenance machine 910*a* and the person 912*a*, may correspond to a time when spatial information is captured by the lawn maintenance machine (e.g., at time $t_0$, the lawn maintenance machine is at the position indicated by 910*a* and the person is at the position indicated by 912*a*, relative to the other objects in the environment).

The spatial information may additionally include information on the properties of surrounding objects such as a fairway 902, a green 904, a body of water 906, and a pin 908. These elements may, alternatively or additionally, be detected by mapping data stored in a database, such as described above. In addition, information on moveable objects, such as a person 912*a*, may be included in the spatial information.

The spatial information captured at time $t_0$ may be used to predict the position of the lawn maintenance machine and other objects in the environment at a time in the future, such as time $t_1$, to produce a predicted environment that is displayed to a user. As described herein, the difference between $t_0$ and $t_1$ may correspond to a predictive offset that is based on the communication latency and/or other processing delays between the time when the spatial information is captured and when the 3-D environment is ultimately displayed to a remote operator. Accordingly, if the predictions are accurate, the positions of the objects and the lawn maintenance machine shown at $t_1$ correspond to the actual positions of the objects and the lawn maintenance machine at the time $t_1$ (e.g., time $t_0$ plus the predictive offset). The aforementioned predictive positions of a lawn maintenance machine and a person are visually illustrated in FIG. 9A as predicted lawn maintenance machine 910*b* and predicted person 912*b* (e.g., the positions of the lawn maintenance machine and person indicated by 910*b* and 912*b* are the predicted positions of those objects at time $t_1$, and are displayed at those positions in the predicted environment).

As discussed herein, the objects 910*b* and 912*b* at time $t_1$ may be predicted based on the spatial information taken with respect to the objects 910*a* and 912*a*. For example, based on sensors, such as described herein, on a lawn maintenance machine, spatial information of a real-world position, speed, velocity, and the like, of the lawn maintenance machine and/or objects in its vicinity may be detected. Based on the spatial information, a predicted position of the objects 910*b* and 912*b* may be determined based on a particular time difference between $t_0$ and $t_1$.

For example, if a delay of a predictive visual feedback system is equivalent to about one second (e.g., accounting for a communication latency between the server and the lawn maintenance machine as well as other processing delays), a virtual environment that simply displays the spatial information received at time $t_0$ would be about one second out-of-date (e.g., it would actually show to the operator where the lawn maintenance machine was one second ago). To account for this delay, the positions of the objects 910*b* and 912*b* may be predicted using a predictive offset. For example, if a location of the virtual lawn maintenance machine 910*a* is known and a velocity is known (e.g., 15 miles per hour north), then a position of the predicted virtual lawn maintenance machine may be predicted as approximately 0.0042 miles north at time $t_1$ (e.g., a time one second ahead of time $t_0$). The position prediction of the lawn maintenance machine may additionally be based at least in part on known motion parameters and/or control inputs to the lawn maintenance machine. Thus, for example, if the lawn maintenance machine receives a turning input, braking input, acceleration input, or any other type of input from a remote operator, the predicted position of the lawn maintenance machine at time $t_1$ can reflect those inputs (and/or the actual resulting motion of the lawn maintenance machine as determined by the sensors onboard the lawn maintenance machine). In this way, properties of the virtual lawn maintenance machine 910*b* may be predicted.

Similarly, a location of the person 912*b* may be predicted based on previously detected spatial information about the person. For example, in some embodiments, sensors on a real-world lawn maintenance machine may detect a velocity (e.g., a speed and direction) of a person as a person walks across a green 904. Based on the detected velocity over some time frame (e.g., prior to and including time $t_0$), the person may be displayed to the user at a predicted position (e.g., the person 912*b*). In some embodiments, the predicted position may be predicted using programmatic rules in addition to spatial information about the person (e.g., the person's detected speed and direction). For example, if a pin 908 is detected near a person, it may be assumed that a person will move toward the pin at 3 miles per hour (e.g., reflecting common golfing practices). Either or both of the above methods may be performed in accordance with the provided disclosure.

While the instant disclosure uses certain values of time, distance, speed, and the like to illustrate how locations and/or positions of objects are predicted, it will be understood that the values are examples for illustrative purposes, and the actual values in an actual implementation may differ. For example, the one-second time difference between $t_0$ and $t_1$ is merely one example, and the actual time difference in a given implementation may be based on a determination of the actual predictive offset of the predictive visual feedback system at a given time (e.g., the real-time value of the communication latency and/or other processing/rendering delays).

In some embodiments, the actual historical positions of objects in the virtual environment may be displayed to the user in the virtual environment so that the operator can view a historical record of where the objects have actually been detected. For example, a historical "path" of the objects within the virtual environment may be shown to the user (e.g., a line or other graphical feature).

The result of predicting the position of the lawn maintenance machine and the person at time $t_1$ is that the predicted virtual environment that is ultimately displayed to the remote operator includes the predicted positions of objects in the virtual environment (e.g., the lawn maintenance machine 910*b* and the person 912*b*) at time $t_1$. These positions are predicted based on the spatial information (including historical spatial information of the objects), but are intended to reflect the actual, real-time locations of the lawn maintenance machine. Thus, if the predictions are accurate, a remote operator who is viewing the virtual environment 900*a* while providing control commands to the lawn maintenance machine (e.g., steering, throttle, brakes, mower blade position, etc.) is essentially viewing the real-time (though predicted) environment of the lawn maintenance machine. The remote operator's inputs for controlling the lawn maintenance machine are therefore acting on the lawn maintenance machine based on the actual state of the environment (e.g., with the objects at their locations at time $t_1$), rather than an outdated state of the environment.

FIG. 9B illustrates a virtual environment 900*b*. The virtual environment 900*b* may be similar to the virtual environment 900*a*, but illustrates how historical spatial information (e.g., from time $t_{-1}$ to time $t_0$) is used to predict the positions of the objects in the virtual environment at time $t_1$.

The properties of a past virtual lawn maintenance machine 910*c* detected at a time $t_{-1}$ (and/or from $t_{-1}$ to time $t_0$) may correspond to the last 'n' frames of camera and/or sensor input, the last 'n' user or autonomous actions, the last 'n' detected spatial properties, and so on. The information detected from $t_{-1}$ to time $t_0$ may then be used to formulate the predictions of the objects in the virtual environment at a future time, such as $t_1$.

For example, between time $t_{-1}$ and $t_0$, the lawn maintenance machine 910*c* may have been travelling at a speed of 10 miles per hour in a particular direction. Accordingly, the predictive visual feedback system may predict the location of the lawn maintenance machine at $t_1$ based on the historical speed and direction of the lawn maintenance machine between $t_{-1}$ and $t_0$. In the case where the speed and direction are constant between $t_{-1}$ and $t_0$, the predictive visual feedback system may assume that the speed and direction will remain constant over the predictive offset (e.g., between time $t_0$ and $t_1$), and predict the position of the lawn maintenance machine accordingly. In some cases, additional factors may be used to predict the position of the lawn maintenance machine, such as if the lawn maintenance machine will encounter an incline or decline (or other obstacle or condition that may change its speed) in the time between $t_0$ and $t_1$.

As another example, between time $t_{-1}$ and $t_0$, the lawn maintenance machine 910*c* may have been undergoing an acceleration (e.g., a change in speed and/or in turning radius). In such cases, the predictive visual feedback system may assume that the acceleration will remain constant over the predictive offset and predict the position of the lawn maintenance machine accordingly. If there are additional factors that indicate the acceleration rate may change between $t_0$ and $t_1$, those factors may also be used to predict the position of the lawn maintenance machine at time $t_1$.

A similar approach may be used to predict the position of the person. For example, between time $t_{-1}$ and $t_0$, the person 912*c* may have been moving towards the pin 908 at a speed of 3 miles per hour. Accordingly, the predictive visual feedback system may predict the location of the person at $t_1$ (912*b*) based on the historical speed and direction of the person. As noted above, the prediction may also include rule-based prediction factors, such as a rule that people walking towards a pin 908 typically stop walking before they reach the pin (e.g., to make a final putt). Such rules may be used in conjunction with the historical data about the person's movements to predict the person's position at time $t_1$.

The interval between $t_{-1}$ and $t_0$ may correspond to a time window, number of frames of spatial information, or any other historical interval. As used herein, spatial information may be captured (by cameras, sensors, and/or other systems) at periodic intervals, which may be referred to as a frame. The interval between $t_{-1}$ and $t_0$ may correspond to a certain number of frames, such as 20 frames, 100 frames, 500 frames, 1000 frames, or any other suitable number of frames. The spatial information associated with a frame may include information such as velocities of moving objects in the environment (e.g., people, animals), a velocity of the lawn maintenance machine, status information of the lawn maintenance machine (e.g., throttle position, brake position, steering position, etc.), a spatial map of the surrounding environment (e.g., including locations, shapes, and other spatial information relating to objects such as trees, rocks, hills, geographical features, etc.), or the like. Thus, the predictive visual feedback system may use the spatial information associated with the 'n' frames captured between $t_{-1}$ and $t_0$ to predict the positions of the objects in the environment.

FIG. 9C illustrates a virtual environment 900*c*, illustrating an example in which the physical state of the lawn maintenance machine at time $t_0$ results in a different predicted position of the lawn maintenance machine at time $t_1$ (as compared to FIGS. 9A-9B, for example). In the example depicted in FIG. 9C, at time $t_0$, the lawn maintenance machine 910*d* has its front wheels turned. Thus, the lawn maintenance machine can be expected not to move straight (as shown in FIGS. 9A-9B), but rather it will turn according to the wheel positions at time $t_0$. The state of the wheels may be included in received spatial information and may be detected from sensors on a real-world lawn maintenance machine, as discussed herein.

In accordance with the turned wheels at time $t_0$, a predicted position of the lawn maintenance machine 910*e* may be based on the direction the wheels are turning. For example, at a time $t_1$, the lawn maintenance machine 910*e* may have moved in a rightward direction, and the location of the lawn maintenance machine 910*e* at time $t_1$ may reflect how far the lawn maintenance machine would have travelled during the interval between $t_0$ and $t_1$ with the wheels in the turned configuration. The example depicted in FIG. 9C is merely exemplary and any physical property of a real-world lawn maintenance machine may be detected and may be used in prediction of predicted virtual lawn maintenance machines (e.g., the velocity, acceleration, jerk (e.g., change in acceleration), tire pressures, tire/wheel alignment, wind, available traction on the current surface, etc.).

As described herein, routes and lawn maintenance operations for a lawn maintenance machine may be created by a remote operator based at least in part on real-time and/or predicted data about the physical environment of the lawn maintenance machine. For example, in some cases a lawn maintenance machine may receive instructions from a server concerning operations of the lawn maintenance machine. For example, a remote operator may instruct a lawn maintenance machine to turn based on positions of a virtual lawn maintenance machine in a virtual environment. Such instructions may be made based off of a predicted position at, for example, time $t_1$ and may be transmitted to a real-world lawn maintenance machine to control an operation of the real-world lawn maintenance machine.

FIG. 10 depicts a flowchart of an example of a method 1000 of generating and displaying a predicted environment and the detection of operations therein. For example, the method 1000 may generate predicted environments (e.g., the relative positions of a lawn maintenance machine and objects in the vicinity of the lawn maintenance machine based off of a predictive delay relative to when spatial information is captured) for display to a remote operator during remote operation of a real-world lawn maintenance machine. The method 1000 may also include receiving instructions for operation of the lawn maintenance machine and providing the instructions to the lawn maintenance machine.

The method 1000 of FIG. 10 may be performed, in some embodiments, after a lawn maintenance machine operates in an autonomous mode. For example, in the autonomous modes discussed herein, there may be an option for a user to initiate a remote-operated mode in response to, for example, an error/condition or a user input. When the remote-operated mode is selected, control of a lawn maintenance machine may transition from an autonomous mode to the remote-operated mode where the user has direct control of the lawn maintenance machine via a control mechanism at an external location. Once the remote-operated mode is activated, operations of method 1000 may proceed including, for example, control that offsets a detected latency.

As discussed with respect to FIGS. 9A-9C, above, a system (e.g., a server 130) may receive spatial information from sensors (e.g., LIDAR, vision-based detection systems (e.g., cameras), acoustic sensors, RADAR, or the like) on a real-world lawn maintenance machine. As the transmission of this spatial information from the lawn maintenance machine to a remote system (e.g., the server 130) may take time, this time (e.g., a delay or latency) may result in the virtual environment that is displayed to the user being delayed from a real-time environment surrounding the lawn maintenance machine. To account for this delay, the latency may be measured and an environment ahead of the spatial information (e.g., in the future relative to the time the spatial information was captured) by the latency may be generated. This may serve to mitigate the effects of latency.

As discussed above, historical data of the lawn maintenance machine (e.g., a speed or direction) may be used as a predictive base to estimate or predict where the lawn maintenance machine exists in real-time (e.g., at $t_1$ in FIG. 9A). For example, a speed of a lawn maintenance machine may be obtained from speedometer, accelerometer, and/or GPS data.

To generate predicted environments, spatial information of one or more objects proximate to the lawn maintenance machine (e.g., objects such as trees, people, vehicles, etc., that are detectable by one or more sensors of the lawn maintenance machine). The spatial information may include information such as the current position/velocity of the associated machine; current position/velocity of objects surrounding the associated machine; recently received sensor data; recently performed user actions; and so on may be obtained at operation 1002. The operation 1002 may include determining a location/velocity of a lawn maintenance machine and/or a location/velocity of objects surrounding the lawn maintenance machine with respect to the received spatial information. The present location/velocity of the lawn maintenance machine may be determined by, for example, global positioning system (GPS) data, relative coordinates based on an initial starting position, and so on.

The location/velocity of objects surrounding the lawn maintenance machine may be also determined with respect to the lawn maintenance machine (e.g., relative to the lawn maintenance machine). For example, sensors on the lawn maintenance machine may capture location/velocity information of an object (e.g., a golf cart, a person, an animal, a stationary object such as a tree, building, or the like) in the vicinity of the machine. In this way, positions and/or velocities of all objects in an environment may be detected and may be used in, for example, a virtual environment as discussed with reference to operation 1004.

In some cases, spatial information (and optionally other types of data) is determined over a historical period. For example, the spatial information may be determined over a predetermined time window. In some cases, the predetermined time window may correspond to a number of previous frames of camera and/or sensor input and/or user actions. As noted above, a frame may correspond to an instance of a cyclic data capture operation. The number of frames may correspond to a fixed time, such as 1 second, 5 seconds, 10 seconds, 20 seconds, or any other suitable time window. The information that is captured over the time window may include location/velocity data of the lawn maintenance machine and objects in the vicinity of the lawn maintenance machine (e.g., within a range of the cameras and/or other sensors of the lawn maintenance machine), commands sent to the lawn maintenance machine, weather information, turf condition information (e.g., the extent to which the lawn maintenance machine is slipping or gripping the ground), or the like.

At operation 1004, a latency may be determined. The latency may correspond to the amount of time required to transmit spatial information from a lawn maintenance machine to a remote system, and may also include other delays due to the capture, processing, and/or rendering of information at the lawn maintenance machine and/or the remote system. The average latency may be determined by measuring the amount of time a packet of information takes to travel from the lawn maintenance machine to the remote system, and optionally adding additional time to account for the capture, processing, and/or rendering of spatial information by the lawn maintenance machine and/or the remote system. Because latency may change dynamically, the latency may be continuously and/or cyclically determined so that a real-time latency is determined.

At operation 1006, received spatial information, and/or other sensor data, may be used, along with the determined latency, to generate a map of a predicted environment (e.g., a predicted virtual environment). For example, the server and/or the lawn maintenance machine may predict, based on the historical spatial information and the latency value, the relative locations of the lawn maintenance machine and the other objects in the vicinity of the lawn maintenance machine, as described with respect to FIGS. 9A-9C. In some cases, generating the map of the predicted environment may include generating a set of values for bounding boxes of objects, semantic segmentation, depth map, velocity map, acceleration map, and an autoencoded vector for a time in the future (e.g., $t_0$ plus the determined latency, referred to in FIGS. 9A-9B as $t_1$).

In some cases, each object in the predicted environment (e.g., trees, people, the lawn maintenance machine, animals, obstacles, etc.) may include or be associated with information such as a location (x, y, z); object class; relative angles; velocity; acceleration; topographic information (for terrain and nonstandard objects); and so on. This information may be used to generate and/or display the predicted environment to the user.

Since the predicted environment is predicted (e.g., it is a prediction intended to represent the real-time environment of the lawn maintenance machine), certain objects, such as other vehicles, people, animals, and the like, may have multiple possible future positions. In the case of multiple possible positions, an object may contain multiple location information along with probabilities and/or confidence values for each. Such objects may additionally be associated with confidence values signifying a likelihood that the object will be in a particular location. In some embodiments, confidence values may be based on the quality and/or quantity of received spatial information. For example, the amount of the last available frames, a resolution of received information, the consistency of motion of the available frames, the type of object and its relative predictability (e.g., trees may be highly predictable and people may be relatively unpredictable), and so on may be used to generate confidence values. Confidence values may be based at least in part on the communications latency between the lawn maintenance machine and the server. Thus, for example, all else being equal, a prediction that accounts for a longer latency (e.g., 10 seconds) may have a lower confidence value (e.g., a greater uncertainty as to its actual position) than a prediction that accounts for a shorter latency (e.g., 1 second). Confidence values may be based on the foregoing factors and/or information either individually (e.g., based only on latency) or in various combinations (e.g., based on latency and object speed; based on latency and object type; based on latency, object speed, object type, and the number of historical frames from which spatial information about the object may be determined; etc.).

If a confidence value is high, then the predicted position (and/or movement) of an object may be considered highly trustworthy, whereas if the confidence value is low, then the predicted position of the object may be considered in flux or relatively untrustworthy. In order to alert a user to the relative confidence value of the positions and/or motions of objects in the predicted environment, objects may be displayed in different manners and/or with indicia that indicate the confidence in the position and/or movement of the object. For example, high confidence values for a given object (e.g., confidence values above a threshold value) may result in the object being displayed in the predicted environment with bold lines and/or with solid colors to signify that the predicted position/motion of the object is associated with a high confidence value. By contrast, low confidence values (e.g., confidence values below a threshold value) may result in the object being displayed with dashed, fuzzy, or blurry lines and/or with more transparent colors to signify that the predicted values are relatively untrustworthy. In some cases, a graphical property of the displayed objects (e.g., transparency, color, line weight, size, etc.) is scaled in accordance with the confidence values. Thus, for example, objects with higher confidence values are displayed with less transparency while objects with lower confidence values are displayed with greater transparency. In some cases, the confidence value may determine or affect the size of the object or an outer boundary around the displayed object. For example, an object with a high confidence value may be displayed in its predicted location and having its predicted (or actual) size, while an object with a lower confidence value (e.g., a moving person) may be shown as an object (e.g., a semi-transparent volume) representing a range of possible predicted positions of the object. As a more specific example, a person walking near the lawn maintenance machine may not walk in a straight line. Accordingly, the system may determine a probabilistic area in which the person may be at a future time (e.g., $t_0$ plus the latency), and display the probabilistic area in the virtual environment (e.g., as a semi-transparent volume, a solid object, a border on the ground, a semi-transparent object surrounding a solid representation of the actual object, or the like). The operator can then make navigation and/or other decisions based on the probabilistic area. In cases where multiple distinct paths may be predicted, such as a golf cart that may turn left or right at an intersection, the system may display representations of both possible paths (optionally in conjunction with an indication of their relative likelihood). In the case of moving objects such as people, vehicles, animals, and the like, this may improve safety as the operator can avoid the entire area if there is any uncertainty about the object's actual position. In some cases, objects may be displayed in conjunction with a numerical confidence value, so that the remote operator can quickly see the confidence value for the position of different objects.

In some cases, the server generates the predicted environment. In some cases, the lawn maintenance machine performs some of the operations associated with generating the predicted environment. For example, the lawn maintenance machine may include FPGAs, ASICs, and/or other processing elements that perform neural network pruning to help minimize the processing time for generating the predicted environment.

In some cases, the entire environment of the lawn maintenance machine may not be contained in the spatial information from the lawn maintenance machine, or some portions of the environment may be expired or old (e.g., if the lawn maintenance machine only captures spatial information from in front of the lawn maintenance machine, and/or if there are obstacles preventing the lawn maintenance machine's sensors from detecting certain objects in the environment). In such cases, out-of-date objects in the predicted environment may have different graphical properties than objects whose spatial information is more recent and/or is more certain. For example, areas of the environment for which data is out-of-date or has not been recently captured may be shown as an empty void, or with another graphical effect to represent its uncertainly. In some cases, objects in the predicted environment may be supplied by satellite images, previously-generated maps, etc., instead of from spatial information captured by the lawn maintenance machine. In such cases, the objects from the images or maps (which are not captured in real time and therefore may not represent the actual current environment) may be displayed and/or rendered in a different manner (e.g., semi-transparent, in a different color, etc.).

The operation of generating the predicted environment may be an ongoing process. For example, as the lawn maintenance machine continues to move about its environment (e.g., in response to commands from the remote operator), the server and/or the lawn maintenance machine may continually and/or cyclically re-generate the predicted environment. Further, as the predicted environment is generated based on the determined latency value, changes in the latency value will be accounted for in the predicted environment as it is continuously and/or cyclically updated. To limit the amount of data being transmitted between the lawn maintenance machine and the server for the purpose of generating the predicted environment, the lawn maintenance machine may send information representing changes in the positions and/or motions of the objects in the environment, rather than sending a complete representation of the environment. Depending on available bandwidth, a video stream and/or still image may additionally be sent.

At operation 1008, the predicted environment generated in response to the determined and received information at operations 1002-1006 may be presented and displayed to a remote operator. In some embodiments, the predicted environment may be generated as a 2-D or 3-D map and may be visually perceptible by a remote operator via, for example, a computer display or a virtual reality headset.

The predicted environment may be rendered with a video game engine such as the UNITY engine. While the predicted environment is being displayed to a remote operator, the remote operator may additionally bring up a video stream from the lawn maintenance machine (e.g., in a picture in picture format).

At operation 1010, an operational command may be received from a human operator interacting with the displayed environment as described with respect to operation 1008. As discussed with reference to FIGS. 9A-9C, for example, a user may interact with a virtual lawn maintenance machine as if in a video game or virtual reality environment. For example, the user may control a direction, speed, operation, and so on of a virtual lawn maintenance machine through the use of various input devices such as a mouse, keyboard, pedal, steering wheel, and so on. Such commands may be received by the remote system and may be used to control an operation of the virtual lawn maintenance machine.

At operation 1012, the operational command may be transmitted to the lawn maintenance machine to control operations of the lawn maintenance machine. For example, if a user inputs a steering command, the steering command may be transmitted to the lawn maintenance machine to affect a direction that the lawn maintenance machine is traveling in. The operational command is transmitted to the lawn maintenance machine as a relative command (e.g., turn 15 degrees to the right), or an absolute command (e.g., continue from location x, y, z, to location $x_1$, $y_1$, $z_1$ along a predetermined path).

In some cases, the lawn maintenance machine may monitor the operational commands it receives and determine whether or not the operational command is appropriate. In this way, the lawn maintenance machine can reject the command and/or terminate the remote operation (at least temporarily). For example, in some cases, the lawn maintenance machine may determine that an operational command would lead to a collision with an object (e.g., whether the lawn maintenance machine will collide with the object), indicating that the operational command may have been based on an inaccurate prediction of the lawn maintenance machine's actual position. Termination of the remote operation may be associated with various actions and/or operations, such as the lawn maintenance machine ceasing to respond to operational commands from the remote operator, the lawn maintenance machine stopping in place (e.g., ceasing motion), the lawn maintenance machine ceasing operation of a cutting blade or other mechanical system (e.g., a spreader, an articulable arm), the lawn maintenance machine sending a signal to the server to alert the server and/or the remote operator that remote operation has been terminated or otherwise ceased (including the lawn maintenance machine ceasing motion). These actions and/or operations may be combined (or used independently) in various implementations of the system.

Figure 11:
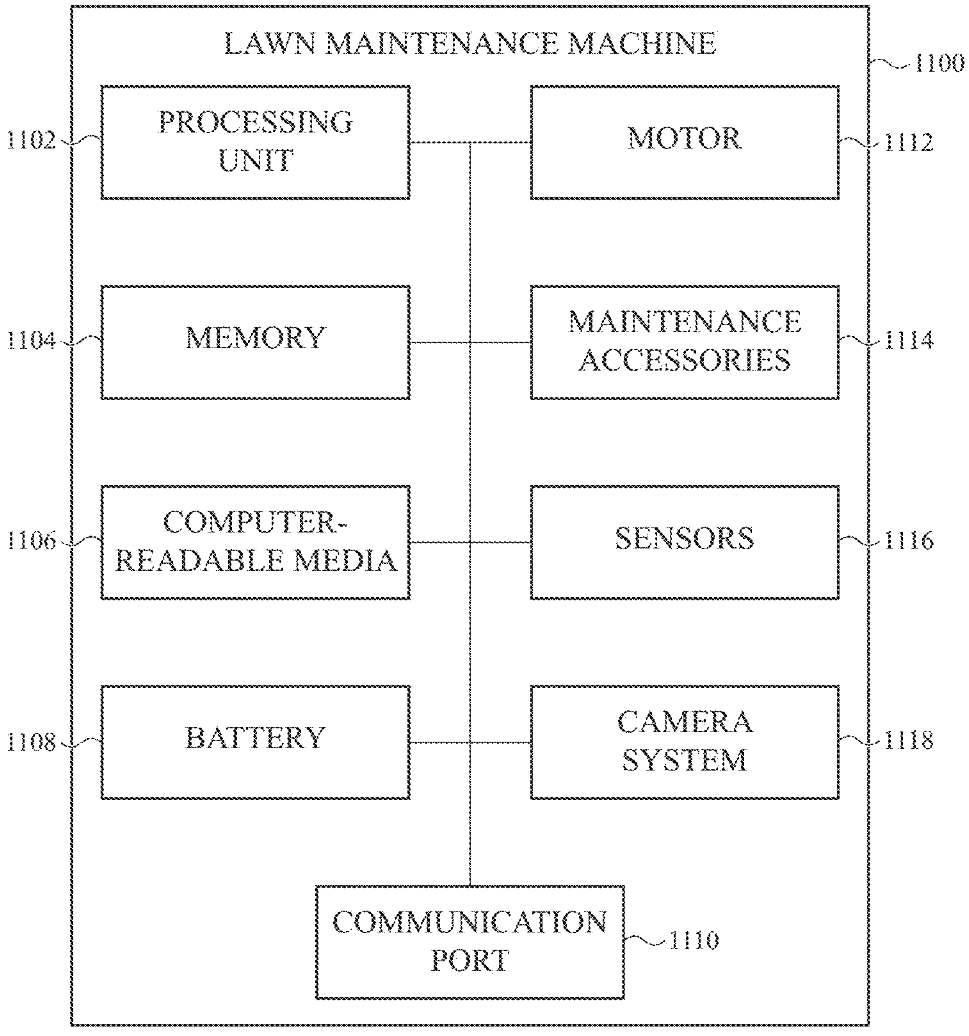
FIG. 11 depicts an example schematic diagram of a lawn maintenance machine, such as described herein.

FIG. 11 depicts an example schematic diagram of a lawn maintenance machine 1100. By way of example, the lawn maintenance machine 1100 of FIG. 11 may correspond to the lawn maintenance machine 110 depicted in FIG. 2 (or any other lawn maintenance machine described herein). To the extent that multiple functionalities, operations, and structures are disclosed as being part of, incorporated into, or performed by the lawn maintenance machine 1100, it should be understood that various embodiments may omit any or all such described functionalities, operations, and structures. Thus, different embodiments of the lawn maintenance machine 1100 may have some, none, or all of the various capabilities, apparatuses, physical features, modes, and operational parameters discussed herein.

As shown in FIG. 11, a lawn maintenance machine 1100 includes a processing unit 1102 operatively connected to computer memory 1104 and/or computer-readable media 1106. The processing unit 1102 may be operatively connected to the memory 1104 and computer-readable media 1106 components via an electronic bus or bridge. The processing unit 1102 may include one or more computer processors or microcontrollers that are configured to perform operations in response to computer-readable instructions. The processing unit 1102 may include the central processing unit (CPU) of the device. Additionally or alternatively, the processing unit 1102 may include other processors within the device including application specific integrated chips (ASIC) and other microcontroller devices.

The processing unit 1102 may at least partially perform the methods discussed herein (including those described with reference to FIGS. 5-8 and 10), and may at least partially perform operations that include the predictive model service 304, the maintenance model 306, or any other operation discussed herein.

The memory 1104 may include a variety of types of non-transitory computer-readable storage media, including, for example, read access memory (RAM), read-only memory (ROM), erasable programmable memory (e.g., EPROM and EEPROM), or flash memory. The memory 1104 is configured to store computer-readable instructions, sensor values, and other persistent software elements. Computer-readable media 1106 also includes a variety of types of non-transitory computer-readable storage media including, for example, a hard-drive storage device, a solid-state storage device, a portable magnetic storage device, or other similar device. The computer-readable media 1106 may also be configured to store computer-readable instructions, sensor values, and other persistent software elements. For example, the memory 1104 and/or computer-readable media 1106 may be configured to store database 302 information, the training service 312, the predictive model service 304, the maintenance model 306, and/or the report generation program 308.

In this example, the processing unit 1102 is operable to read computer-readable instructions stored on the memory 1104 and/or computer-readable media 1106. The computer-readable instructions may be provided as a computer-program product, software application, or the like.

The lawn maintenance machine 1100 may also include a battery 1108 that is configured to provide electrical power to the components of the lawn maintenance machine 1100. The battery 1108 may include one or more power storage cells that are linked together to provide an internal supply of electrical power. The battery 1108 may be operatively coupled to power management circuitry that is configured to provide appropriate voltage and power levels for individual components or groups of components within the lawn maintenance machine 1100. The battery 1108, via power management circuitry, may be configured to receive power from an external source, such as an AC power outlet, a charging dock, an auxiliary battery, a battery-enabled protective case, or the like. The battery 1108 may store received power so that the lawn maintenance machine 1100 may operate without connection to an external power source for an extended period of time, which may range from several hours to several days. Power management circuitry may include wireless charging components, such as a charging coil that inductively couples to an output coil of a wireless charger to charge the battery 1108.

The lawn maintenance machine 1100 may also include a communication port 1110 that is configured to transmit and/or receive signals or electrical communication from an external or separate device. The communication port 1110 may be configured to couple to an external device via a cable, adaptor, or other type of electrical connector. In some embodiments, the communication port 1110 may be used to couple the lawn maintenance machine 1100 to an accessory, including a dock, a server (e.g., the server 130), or other device configured to send and/or receive electrical signals.

As shown in FIG. 11, the lawn maintenance machine 1100 also includes a motor 1112. The motor 1112 may include a gas-powered engine, an electricity powered propulsion unit, a battery powered propulsion unit, a drive train, or the like. If the motor 1112 is gas-powered, the motor 1112 may also include various tanks for holding and administering gasoline. If the motor 1112 is battery or electricity powered, the engine may include various electrical systems for administering electrical power. The motor and/or drive train may be configured to propel the lawn maintenance machine 1100 via, for example, internal combustion or battery power.

In some embodiments, the lawn maintenance machine 1100 includes one or more maintenance accessories 1114. Maintenance accessories 1114 may include a grass-cutting blade, a robotic arm, and a spreader, as described with respect to FIG. 2. Maintenance accessories 1114 may include any accessory that performs environmental maintenance, such as an aerator, pest control devices, and the like.

The lawn maintenance machine 1100 may also include sensors 1116. The sensors 1116 may detect inputs provided by an environment or user. The sensors 1116 may gather environmental data and may provide the gathered data to the predictive model service, as will be discussed herein. The sensors 1116 may include humidity sensor(s), temperature sensor(s) (e.g., a thermometer), heat/infrared (IR) sensor(s), spectrograph(s), hyperspectral sensor(s), accelerometer(s), barometric pressure sensor(s), visual sensor(s) (e.g., a light detector), acoustic/audio sensors (e.g., a microphone), various vehicular sensors (e.g., sensors to detect clogged reels, oil pressure, tire pressure, fuel levels, battery charge levels, hydraulic leaks, and the like), light or radio detection and ranging systems (LIDAR/RADAR), and the like. The sensors 1116 may provide the processing unit 1102 with data about the lawn maintenance machine 1100 such as, for example, the status of various systems and/or mechanisms of the lawn maintenance machine 1100. The status of the lawn maintenance machine 1100 (e.g., of its systems and/or mechanisms) may be used to identify items that require maintenance or repairs, as well as to track and/or determine maintenance schedules.

The lawn maintenance machine 1100 may also include a camera system 1118. The camera system 1118 may include multiple forward-facing cameras, a number of rear-, down-, and side-facing cameras, and/or any combination thereof (including one or more individual cameras configured to capture image data in 360 degrees). The image data from any of the considered cameras may be sent to the processing unit 1102 or the server 130 (see FIG. 1) for use in the control of the lawn maintenance machine 1100. The cameras on the lawn maintenance machine 1100 may be any suitable cameras, such as HD cameras, 360-degree cameras, film cameras, digital cameras, and may have any suitable frame rate such as a frame rate of 30 frames-per-second (FPS) or above and any suitable resolution such as, for example, a pixel resolution of 256×256 or higher.

While the lawn maintenance machine 1100 is described as having a particular set of components, the lawn maintenance machine 1100 is not limited to only those components described herein. For example, a lawn maintenance machine may include more than one of the components described with respect to FIG. 11 or elsewhere in the instant application, and may indeed include other components not described herein.

Figure 12:
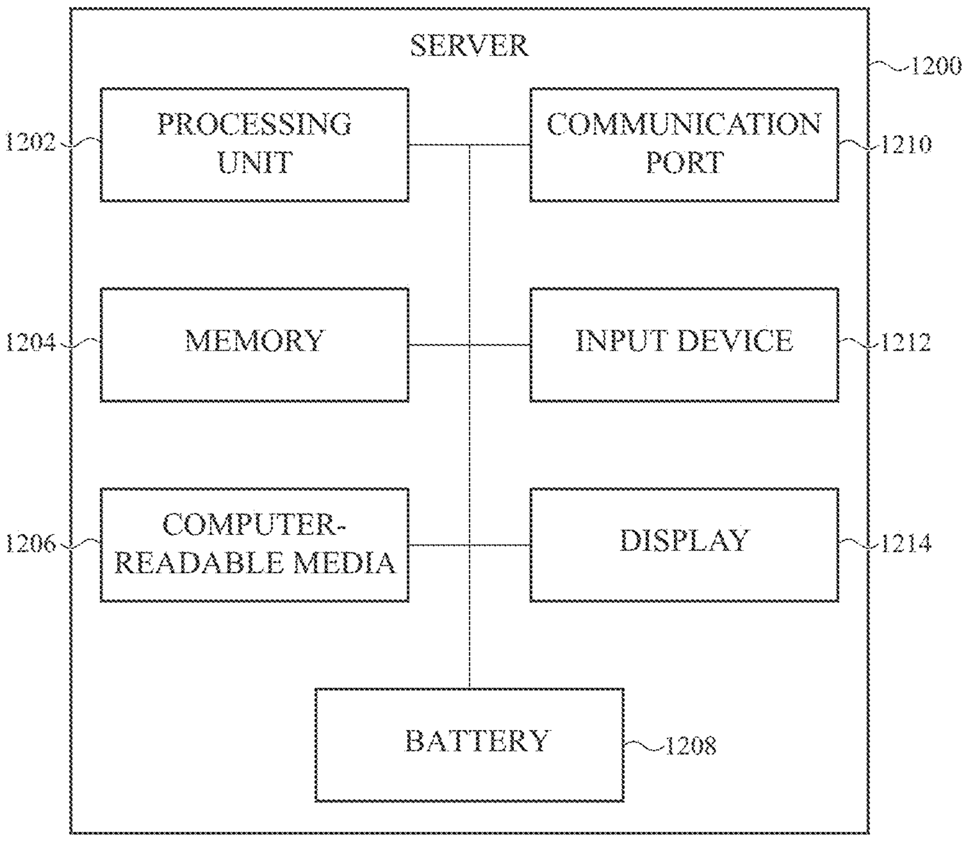
FIG. 12 depicts an example schematic diagram of a server, such as described herein.

FIG. 12 depicts an example schematic diagram of server 1200. By way of example, the server 1200 of FIG. 12 may correspond to the server 130 shown in FIG. 3 (or any other server described herein). The server 1200 may also correspond to multiple discrete computers networked together or otherwise working in concert to perform the operations of the server 1200. To the extent that multiple functionalities, operations, and structures are disclosed as being part of, incorporated into, or performed by the server 1200, it should be understood that various embodiments may omit any or all such described functionalities, operations, and structures. Thus, different embodiments of the server 1200 may have some, none, or all of the various capabilities, apparatuses, physical features, modes, and operational parameters discussed herein.

As shown in FIG. 12, a server 1200 includes a processing unit 1202 operatively connected to computer memory 1204 and/or computer-readable media 1206. The processing unit 1202 may be operatively connected to the memory 1204 and computer-readable media 1206 components via an electronic bus or bridge. The processing unit 1202 may include one or more computer processors or microcontrollers that are configured to perform operations in response to computer-readable instructions. The processing unit 1202 may include the central processing unit (CPU) of the device and/or the graphics processing unit (GPU) of the device. Additionally or alternatively, the processing unit 1202 may include other processors within the device including application specific integrated chips (ASIC) and other microcontroller devices. The processing unit 1202 may at least partially perform the methods discussed herein (e.g., those described with reference to FIGS. 5-8 and 10), and may at least partially perform operations performed on server 130, such as the training service 312, the predictive model service 304, the maintenance model 306, or any other operation discussed herein.

The memory 1204 may include a variety of types of non-transitory computer-readable storage media, including, for example, read access memory (RAM), read-only memory (ROM), erasable programmable memory (e.g., EPROM and EEPROM), or flash memory. The memory 1204 is configured to store computer-readable instructions, sensor values, and other persistent software elements. Computer-readable media 1206 also includes a variety of types of non-transitory computer-readable storage media including, for example, a hard-drive storage device, a solid-state storage device, a portable magnetic storage device, or other similar device. The computer-readable media 1206 may also be configured to store computer-readable instructions, sensor values, and other persistent software elements. For example, the memory 1204 and/or computer-readable media 1206 may be configured to store database 302 information, model(s) defining a training service 312, a predictive model service 304, a maintenance model 306, and/or a report generation program 308.

In this example, the processing unit 1202 is operable to read computer-readable instructions stored on the memory 1204 and/or computer-readable media 1206. The computer-readable instructions may be provided as a computer-program product, software application, or the like.

The server 1200 may also include a battery 1208 that is configured to provide electrical power to the components of the server 1200. The battery 1208 may include one or more power storage cells that are linked together to provide an internal supply of electrical power. The battery 1208 may be operatively coupled to power management circuitry that is configured to provide appropriate voltage and power levels for individual components or groups of components within the server 1200. The battery 1208, via power management circuitry, may be configured to receive power from an external source, such as an AC power outlet, a charging dock, an auxiliary battery, a battery-enabled protective case, or the like. The battery 1208 may store received power so that the server 1200 may operate without connection to an external power source for an extended period of time, which may range from several hours to several days. Power management circuitry may include wireless charging components, such as a charging coil that inductively couples to an output coil of a wireless charger to charge the battery 1208. The server 1200 may also exist without battery 1208. In this embodiment, the server 1200 may be plugged directly into an electrical outlet to receive power. The battery 1208 may be charged by a wireless charging system (e.g., an inductive charging system) and/or by a wired charging system (e.g., via an outlet).

The server 1200 may also include a communication port 1210 that is configured to transmit and/or receive signals or electrical communication from an external or separate device. The communication port 1210 may be configured to couple to an external device via a cable, adaptor, or other type of electrical connector. In some embodiments, the communication port 1210 may be used to couple the server 1200 to an accessory, including a dock or case, a stylus or other input device, smart cover, smart stand, keyboard, or other device configured to send and/or receive electrical signals.

In some embodiments, the server 1200 includes one or more input devices 1212. An input device 1212 is a device that is configured to receive user input. The one or more input devices 1212 may include, for example, a rotatable input system, a push button, a touch-activated button, a keyboard, a key pad, or the like (including any combination of these or other components). In some embodiments, the input device 1212 may provide a dedicated or primary function, including, for example, a power button, volume buttons, home buttons, scroll wheels, and camera buttons.

As shown in FIG. 12, the server 1200 also includes a display 1214. The display 1214 may include a liquid-crystal display (LCD), organic light emitting diode (OLED) display, light emitting diode (LED) display, an electronic ink (e-ink) display, or the like. If the display 1214 is an LCD, the display 1214 may also include a backlight component that can be controlled to provide variable levels of display brightness. If the display 1214 is an OLED or LED type display, the brightness of the display 1214 may be controlled by modifying the electrical signals that are provided to display elements.

While the server 1200 is described as having a particular set of components, the server 1200 is not limited to only those components described herein. For example, a device may include more than one of the components described with respect to FIG. 12 or elsewhere in the instant application, and may indeed include other components not described herein.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

In this system, a low-bandwidth, zero-latency communications method may utilize a deep neural network to predict a future environment state given current camera input, recent user actions, and average latency between the field device and the end user computer.

Given the most recent frames of a camera input, the recent user actions, and a latency output, a set of predictive values for bounding boxes of objects, semantic segmentation, depth map, velocity map, acceleration map, and an auto-encoded vector for time zero and multiple probabilistic predictions may be estimated. A prediction may be determined by adding an average latency value to a desired time in the future. For example, a prediction may be a time added together with an average latency. These values may then be used to construct an environmental map using the absolute, e.g., from GPS data, or relative coordinates, e.g., based on an initial starting position.

The generated environmental map may consist of the machine's location and information of different environmental objects. The information may include location (e.g., (x,y) or (x,y,z) coordinates), object class (e.g., stationary or moveable), relative angles, velocity, acceleration, topographic information (for terrain and nonstandard objects), and so on. Since the map is created as a predicted environment, to enable zero latency, certain objects, such as other vehicles, may have multiple likely future positions. In the case of multiple likely positions, this object will contain multiple location information along with confidence value/probability that each object will be at the displayed location.

To limit bandwidth, changes of the environmental map may be sent to a client device along with an auto-encoded vector. Based on the available bandwidth, video data or image data may additionally be transmitted. On the client device, the environmental map may be rendered through a game engine (e.g. the UNITY engine by UNITY TECHNOLOGIES). A user may additionally view a video stream, if an appropriate amount of bandwidth is available, as a picture-in-picture display.

Style transfer or other methods may be used along with the auto-encoded vector and/or video stream/camera images to increase the realism of a rendered environment. In cases of multiple likely positions for objects, the most likely may be rendered along with a ghost or lower opacity image of other potential positions along with labeling a known real position at a current time and latency. Additional predictions may be used to overlay a future predicted path, such as another vehicle taking an action of going to the left or right.

Once an environmental map is created, a user with a virtual headset, or other display device, may be free to look in any direction. Since portions of the environmental map may be known, if the objections are stationary, different rendering may be used for moveable objects. Some areas in the environmental map may not have any associated data. These areas may be shown as empty voids. In some cases, additional information such as known environments, satellite images, and so on may be used to construct portions of the environmental map in advance, although these areas may be rendered in a way to allow a user to know that associated sensors have not yet gathered data about the area (e.g., in dashed, blurred, or monochromatic lines).

In certain cases, such as a machine being stuck, a found buried pipe while digging, object collision for a drone, and so on, the prediction may be different than what actually occurs. In these cases, the error between prediction and occurrence may be used to alert the user and render the environment based with latency, and, if possible, switch the user to a live video stream.

As deep neural networks and environmental map generation may add time to a system, and since the probability of future predictions being accurate may decrease as a user looks further into the future, the use of neural network pruning along with field programmable gate arrays (FPGA) and application-specific integrated circuits (ASIC) may be used on, for example, the client device to minimize the processing time.

Accordingly, one may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

What is claimed is:

1. A method for operating an autonomous lawnmower using low-bandwidth communication, the method comprising:

receiving first data from a camera mounted to the autonomous lawnmower, the first data comprising at least one frame taken during a recent time period;

receiving second data, the second data comprising at least one of a position or a speed of the autonomous lawnmower;

determining a latency between the autonomous lawnmower and a client device communicatively coupled to the autonomous lawnmower;

predicting, based on the first data, the second data, and the latency, a future environmental state of the autonomous lawnmower, the future environmental state comprising a predicted location of an object with respect to the autonomous lawnmower at a future time;

generating an environmental map based on the future environmental state;

causing displaying of the environmental map on the client device; and in response to receiving an operational command while the environmental map is displayed on the client device, causing the autonomous lawnmower to perform at least one of steering the autonomous lawnmower or changing a velocity of the autonomous lawnmower.

2. The method of claim 1, wherein:

the object is a dynamic object; and the predicted location of the object is further based on movement data of the object and the determined latency.

3. The method of claim 1, wherein:

the environmental map comprises depth information of a surface and a bounding box of an area; and the future environmental state includes a predicted path of the autonomous lawnmower calculated based on the depth information of the surface and the speed of the autonomous lawnmower, the predicted path within the bounding box of the area.

4. The method of claim 1, wherein the predicted location is a predicted first location, and the method further comprises:

calculating a first confidence score of the predicted first location of the object at the future time;

predicting a second location of the object with respect to the autonomous lawnmower at the future time; and calculating a second confidence score of the predicted second location of the object at the future time.

5. The method of claim 4, further comprising:

causing display of the environmental map including the predicted first location and the predicted second location, wherein:

the object in the predicted first location is displayed with a first opacity associated with the first confidence score; and the object in the second location is displayed with a second opacity associated with the second confidence score.

6. The method of claim 1, further comprising:

after predicting the future environmental state, comparing the prediction with an actual environmental state; and in response to detecting a threshold difference between a location of the object in the predicted future environmental state and a location of the object in the actual environmental state, causing display of a live video feed.

7. The method of claim 1, further comprising:

identifying an area of the environmental map having null information;

obtaining satellite images for the area; and rendering an updated environmental map using the satellite images for the area.

8. The method of claim 1, wherein determining the latency is based on:

an average time for a packet of information to travel from the autonomous lawnmower to the client device; and an additional time for at least one of processing or rendering spatial information.

9. An autonomous lawnmower system comprising:

an autonomous lawnmower comprising:

a camera system configured to capture image data;

a steering mechanism;

a cutting mechanism;

a drive train; and a navigation system configured to generate position data; and a controller communicatively coupled with the camera system and the drive train, the controller configured to:

receive image data from the camera system, the image data comprising a timestamp;

receive position data from the navigation system;

calculate a latency between the controller and a client device communicatively coupled to the controller;

predict a future environmental state at a first time, the prediction based on the image data, the position data, and the latency;

generate an environmental map based on the future environmental state;

cause rendering of the environmental map on the client device, the environmental map including a predicted position of the autonomous lawnmower transmitted to the client device at a second time before the first time, wherein a difference between the first time and the second time is greater than or equal to the latency; and cause the autonomous lawnmower to control at least one of the steering mechanism, the cutting mechanism, or the drive train of the autonomous lawnmower in response to a control command received at the client device.

10. The autonomous lawnmower system of claim 9, the controller further configured to:

identify, based on the image data, an object within the environmental map;

predict a position of the object relative to the autonomous lawnmower at the first time; and cause rendering of the object at the predicted position within the environmental map on the client device.

11. The autonomous lawnmower system of claim 10, wherein:

the object is a dynamic object; and the controller is further configured to:

predict a future object position based on image data, an estimated speed, and an estimated trajectory of the object; and the rendering includes the future object position.

12. The autonomous lawnmower system of claim 9, wherein the controller is further configured to:

in response to the latency satisfying a criteria, transmit to the client device a video feed captured via the camera system.

13. The autonomous lawnmower system of claim 9 wherein the predicting is performed using a deep neural network.

14. The autonomous lawnmower system of claim 9, further comprising:

in response to a collision with an object, cause display of an alert at the client device;

cease display of the environmental map; and cause display of a live video stream at the client device.

15. A method for operating an autonomous lawnmower, the method comprising:

extracting, from a camera system mounted to the autonomous lawnmower, visual data of an area;

determining a steering direction of the autonomous lawnmower;

determining an average latency between the autonomous lawnmower and a client device communicatively coupled to the autonomous lawnmower;

using a deep neural network, predicting a future environmental state of the area at a first time, the prediction based at least in part on the visual data and the steering direction;

generating an environmental map based on the predicted future environmental state;

transmitting, to the client device, the environmental map including the future environmental state, the environmental map transmitted in accordance to the average latency such that the future environmental state is displayed at the first time when the first time corresponds to a current time; and in response to a user input received at the client device, controlling a mowing operation of the autonomous lawnmower.

16. The method of claim 15, further comprising causing display, at the client device, of the environmental map, the environmental map viewable as a 360 degree view.

17. The method of claim 15, wherein:

the environmental map comprises spatial information of the area including a surrounding object; and the predicted future environmental state includes a position of the autonomous lawnmower relative to the surrounding object.

18. The method of claim 15, wherein the future environmental state is a first future environmental state, the method further comprising:

in response to a time period elapsing, constructing an updated environmental map based on a second future environmental state; and transmitting the updated environmental map to the client device, the updated environmental map comprising an auto-encoded vector.

19. The method of claim 15 wherein the environmental map comprises a bounding box of the area.

20. The method of claim 15, wherein the environmental map comprises a plurality of predicted positions for an object, each predicted position of the plurality of predicted positions displayed in accordance with a calculated probability.

21. An autonomous lawnmowing system comprising:

a controller configured to communicatively couple with an autonomous lawnmower, the autonomous lawnmower comprising:

a camera system configured to capture image data;

a steering mechanism;

a cutting mechanism;

a drive train; and a navigation system configured to generate position data, the controller further configured to:

receive image data from the camera system, the image data comprising a timestamp;

receive position data from the navigation system;

calculate a latency between the controller and a client device communicatively coupled to the controller;

predict a future environmental state at a first time, the prediction based on the image data, the position data, and the latency;

generate an environmental map based on the future environmental state; and cause rendering of the environmental map on the client device, the environmental map including a predicted position of the autonomous lawnmower transmitted to the client device at a second time before the first time, wherein a difference between the first time and the second time is greater than or equal to the latency; and cause the autonomous lawnmower to control at least one of the steering mechanism, the cutting mechanism, or the drive train of the autonomous lawnmower in response to a control command received at the client device.

22. The autonomous lawnmowing system of claim 21, wherein the environmental map comprises a plurality of predicted positions for an object, each predicted position of the plurality of predicted positions displayed in accordance with a calculated probability.

23. The autonomous lawnmowing system of claim 22, wherein:

the object is a dynamic object; and the controller is further configured to:

predict a future object position based on image data, an estimated speed, and an estimated trajectory of the object; and the rendering includes the future object position.

* * * * *